(12) United States Patent
Diankov

(10) Patent No.: US 11,027,427 B2
(45) Date of Patent: Jun. 8, 2021

(54) CONTROL DEVICE, PICKING SYSTEM, DISTRIBUTION SYSTEM, PROGRAM, AND CONTROL METHOD

(71) Applicant: MUJIN, Inc., Tokyo (JP)

(72) Inventor: Rosen Diankov, Tokyo (JP)

(73) Assignee: MUJIN, Inc., Tokyo (JP)

( * ) Notice: Subject to any disclaimer, the term of this patent is extended or adjusted under 35 U.S.C. 154(b) by 0 days.

(21) Appl. No.: 16/592,760

(22) Filed: Oct. 3, 2019

(65) Prior Publication Data
US 2020/0030978 A1 Jan. 30, 2020

Related U.S. Application Data

(63) Continuation of application No. PCT/JP2017/014151, filed on Apr. 4, 2017.

(51) Int. Cl.
*B25J 9/16* (2006.01)
*B65G 47/90* (2006.01)

(52) U.S. Cl.
CPC ........... *B25J 9/1666* (2013.01); *B25J 9/1697* (2013.01); *B65G 47/905* (2013.01)

(58) Field of Classification Search
CPC combination set(s) only.
See application file for complete search history.

(56) References Cited

U.S. PATENT DOCUMENTS

| 4,835,450 A | 5/1989 | Suzuki |
| 4,858,974 A | 8/1989 | Stannek |
| 5,308,221 A | 5/1994 | Shimokoshi et al. |
| 6,290,454 B1 | 9/2001 | Huang et al. |
| 9,095,977 B2 | 8/2015 | Yamamoto |
| 9,492,923 B2 | 11/2016 | Wellman et al. |
| 10,131,051 B1 * | 11/2018 | Goyal .................... B25J 9/1697 |
| 10,132,613 B2 | 11/2018 | Yoshikawa |
| 10,144,126 B2 | 12/2018 | Krohne |

(Continued)

FOREIGN PATENT DOCUMENTS

| CN | 101794180 A | 8/2010 |
| CN | 102414696 A | 4/2012 |

(Continued)

OTHER PUBLICATIONS

Office Action issued for counterpart German Application No. 112017007398.7, drafted by the German Patent Office dated Feb. 18, 2020.

(Continued)

*Primary Examiner* — Kyle O Logan
(74) *Attorney, Agent, or Firm* — Medler Ferro Woodhouse & Mills PLLC

(57) ABSTRACT

A point cloud information acquiring unit for acquiring point cloud information of a region including at least one of the picking hand and the work at a time which is at least one of (i) when the picking hand picks the work at the first position, (ii) when the picking hand moves the work out of the first container, (iii) when the picking hand moves the work in the second container and (iv) when the picking hand arranges the work at the second position; and an abnormality detection unit for detecting an abnormality based on the point cloud information acquired by the point cloud information acquiring unit are included.

7 Claims, 16 Drawing Sheets

FIG. 1

(56) References Cited

U.S. PATENT DOCUMENTS

| | | | |
|---|---|---|---|
| 10,202,244 B2 | 2/2019 | Kojima | |
| 10,350,755 B2 | 7/2019 | Wagner et al. | |
| 10,363,660 B2 | 7/2019 | Yajima | |
| 2002/0169522 A1 | 11/2002 | Kanno | |
| 2006/0265103 A1 | 11/2006 | Orita | |
| 2010/0182231 A1 | 7/2010 | Morimiya | |
| 2011/0251717 A1 | 10/2011 | Furukawa | |
| 2012/0053728 A1 | 3/2012 | Theodorus | |
| 2012/0265342 A1 | 10/2012 | Kumiya | |
| 2013/0094932 A1 | 4/2013 | Kutsukake | |
| 2013/0166061 A1 | 6/2013 | Yamamoto | |
| 2013/0217385 A1 | 8/2013 | Das | |
| 2013/0218324 A1 | 8/2013 | Furuya | |
| 2013/0238124 A1 | 9/2013 | Suzuki | |
| 2013/0238125 A1 | 9/2013 | Suzuki | |
| 2014/0052297 A1* | 2/2014 | Mattern | B25J 9/1687 700/259 |
| 2014/0074288 A1* | 3/2014 | Satou | B25J 9/1612 700/253 |
| 2014/0081452 A1 | 3/2014 | Ito | |
| 2014/0157732 A1 | 6/2014 | Gasber | |
| 2014/0277719 A1 | 9/2014 | Kamiya | |
| 2014/0277731 A1 | 9/2014 | Kamiya | |
| 2015/0003678 A1 | 1/2015 | Watanabe | |
| 2015/0127162 A1 | 5/2015 | Gotou | |
| 2015/0169947 A1 | 6/2015 | Kawaguchi | |
| 2015/0321354 A1 | 11/2015 | Nishihara | |
| 2015/0328774 A1 | 11/2015 | Yajima | |
| 2015/0352717 A1 | 12/2015 | Mundt | |
| 2015/0375415 A1 | 12/2015 | Sausset | |
| 2016/0167227 A1* | 6/2016 | Wellman | B25J 9/1612 700/259 |
| 2016/0293467 A1 | 10/2016 | Caveney | |
| 2016/0332299 A1* | 11/2016 | Suzuki | G06K 9/00664 |
| 2017/0028562 A1* | 2/2017 | Yamazaki | B25J 9/1697 |
| 2017/0057092 A1* | 3/2017 | Ito | B25J 9/1697 |
| 2018/0117766 A1* | 5/2018 | Atohira | B25J 9/1671 |
| 2018/0345483 A1* | 12/2018 | Sirkett | B25J 9/1612 |
| 2019/0061159 A1* | 2/2019 | Domae | B25J 9/1676 |
| 2020/0016742 A1* | 1/2020 | Ishikawa | B25J 9/1697 |

FOREIGN PATENT DOCUMENTS

| | | |
|---|---|---|
| CN | 104057456 A | 9/2014 |
| CN | 104487999 A | 4/2015 |
| CN | 104608126 A | 5/2015 |
| CN | 105033998 A | 11/2015 |
| CN | 105034008 A | 11/2015 |
| CN | 105034024 A | 11/2015 |
| CN | 105184019 A | 12/2015 |
| CN | 105814677 A | 7/2016 |
| CN | 106339831 A1 | 1/2017 |
| CN | 106392528 A | 2/2017 |
| CN | 104853990 B | 3/2017 |
| CN | 106477068 A | 3/2017 |
| DE | 10 2017 125 190 A1 | 5/2018 |
| DE | 11 2017 002 114 T5 | 1/2019 |
| DE | 10 2016 005 637 B4 | 2/2019 |
| EP | 2952296 A2 | 12/2015 |
| EP | 2960022 A1 | 12/2015 |
| JP | S6334093 A | 2/1988 |
| JP | 2000263481 A | 9/2000 |
| JP | 2002331480 A | 11/2002 |
| JP | 2006326703 A | 12/2006 |
| JP | 2007222951 A | 9/2007 |
| JP | 2007316942 A | 12/2007 |
| JP | 2010005769 A | 1/2010 |
| JP | 2010089238 A | 4/2010 |
| JP | 2010207989 A | 9/2010 |
| JP | 2010214544 A | 9/2010 |
| JP | 2011083882 A | 4/2011 |
| JP | 2011129082 A | 6/2011 |
| JP | 5044991 B2 | 10/2012 |
| JP | 2012187697 A | 10/2012 |
| JP | 2012223845 A | 11/2012 |
| JP | 2012229111 A | 11/2012 |
| JP | 2013086184 A | 5/2013 |
| JP | 2013132742 A | 7/2013 |
| JP | 2013169605 A | 9/2013 |
| JP | 2013184278 A | 9/2013 |
| JP | 2014054715 A | 3/2014 |
| JP | 2014058004 A | 4/2014 |
| JP | 2014073550 A | 4/2014 |
| JP | 2014161965 A | 9/2014 |
| JP | 2014180704 A | 9/2014 |
| JP | 2014180705 A | 9/2014 |
| JP | 2014205209 A | 10/2014 |
| JP | 2015009314 A | 1/2015 |
| JP | 2015044274 A | 3/2015 |
| JP | 2015058492 A | 3/2015 |
| JP | 2015510472 A | 4/2015 |
| JP | 2015510742 A | 4/2015 |
| JP | 2015197312 A | 11/2015 |
| JP | 2015202544 A | 11/2015 |
| JP | 2015213973 A | 12/2015 |
| JP | 2015217468 A | 12/2015 |
| JP | 2016091053 A | 5/2016 |
| JP | 2016514081 A | 5/2016 |
| JP | 2016147330 A | 8/2016 |
| JP | 2016203350 A | 12/2016 |
| JP | 2017033429 A | 2/2017 |
| JP | 2016091053 A | 5/2019 |
| WO | 2013105900 A1 | 7/2013 |

OTHER PUBLICATIONS

Notice of First Office Action for Patent Application No. 201780089342. 7, issued by The National Intellectual Property Administration of the People's Republic of China dated May 6, 2020.

Office Action issued for counterpart Japanese Application No. 2017-518564, issued by the Japan Patent Office dated Jul. 10, 2018 (drafted on Jul. 3, 2018).

Decision to Grant a Patent issued for counterpart Japanese Application No. 2017-518564, drafted by the Japan Patent Office dated Oct. 31, 2018.

Office Action issued for counterpart Japanese Application No. 2017-518564, drafted by the Japan Patent Office dated Jun. 1, 2017.

International Search Report and (ISA/237) Written Opinion of the International Search Authority for International Patent Application No. PCT/JP2017/014151, mailed by the Japan Patent Office dated Jun. 13, 2017.

Supplementary International Search Report for International Application No. PCT/JP2017/014151, mailed by the European Patent Office dated Jul. 24, 2019.

Office Action issued for counterpart Japanese Application No. 2017-518564, drafted by the Japan Patent Office dated Dec. 19, 2017.

Office Action issued for counterpart German Application 112017007394. 4, issued by the Germany intellectual Property Office dated Apr. 23, 2020.

Notice of First Office Action for Patent Application No. 201780089313. 0, issued by the National Intellectual Property Administration of the People's Republic of China dated Apr. 28, 2020.

Decision to Grant a Patent issued for Japanese Application No. 2017-518565, drafted by the Japan Patent Office dated Oct. 31, 2017.

Office Action issued for Japanese Application No. 2017-518565, drafted by the Japan Patent Office dated May 26, 2017.

International Search Report and (ISA/237) Written Opinion of the International Search Authority for International Patent Application No. PCT/JP2017/014133, mailed by the Japan Patent Office dated Jun. 13, 2017.

Office Action issued for counterpart Japanese Application No. 2017-518573, drafted by the Japan Patent Office dated May 23, 2017.

Office Action issued for counterpart Japanese Application No. 2017-518573, drafted by the Japan Patent Office dated Nov. 22, 2017.

(56) References Cited

OTHER PUBLICATIONS

Decision to Grant a Patent issued for counterpart Japanese Application No. 2017-518573, drafted by the Japan Patent Office dated Jun. 12, 2018.
International Search Report and (ISA/237) Written Opinion of the international Search Authority for International Patent Application No. PCT/JP2017/014146, mailed by the Japan Patent Office dated Jun. 6, 2017.
Supplementary International Search Report for International Application No. PCT/JP2017/014146, mailed by the European Patent Office dated Jul. 24, 2019.
Lars-Peter Ellekilde et al, "Motion planning efficient trajectories for industrial bin-picking", international Journal of Robotics Research, Jun. 20 2013, pp. 991-1004, vol. 32; No. 9-10, SAGE.
Notice of First Office Action for Patent Application No. 201780089325.3, issued by The China National Intellectual Property Administration dated May 8, 2020.
Decision to Grant a Patent issued for counterpart Japanese Application No. 2017-518574, drafted by the Japan Patent Office dated Oct. 31, 2017.
Office Action issued for counterpart Japanese Application No. 2017-518574, drafted by the Japan Patent Office dated May 26, 2017.
Supplementary International Search Report for International Application No. PCT/JP2017/014147 mailed by the European Patent Office dated Jul. 24, 2019.
Cowley Anthony et al, "Perception and motion planning for pick-and-place of dynamic objects", 2013 IEEE/RSJ International Conference on Intelligent Robots and Systems, Nov. 3 2013, pp. 816-623.
Park Chonhyon et al, "Real-time optimization-based planning in dynamic environments using GPUs", 2013 IEEE International Conference on Robotics and Automation (ICRA), May 6 2013, pp. 4090-4097.
International Search Report and (ISA/237) Written Opinion of the international Search Authority for International Patent Application No. PCT/JP2017/014147, mailed by the Japan Patent Office dated Jun. 6, 2017.
International Search Report and (ISA/237) Written Opinion of the International Search Authority for International Patent Application No. PCT/JP2017/014140, mailed by the Japan Patent Office dated Jun. 13, 2017.
Supplementary International Search Report for International Application No. PCT/JP2017/014140, mailed by the European Patent Office dated Jul. 24, 2019.
Office Action issued for Japanese Application No. 2017-518561, drafted by the Japan Patent Office dated May 29, 2017.
Office Action issued for Japanese Application No. 2017-518561, drafted by the Japan Patent Office dated Dec. 22, 2017.
Decision to Grant a Patent issued for Japanese Application No. 2017-518561; drafted by the Japan Patent Office dated Mar. 2. 2018.
Notice of First Office Action for Patent Application No. 201780089346,5, issued by the National Intellectual Property Administration of the People's Republic of China dated Apr. 24, 2020.
Office Action in CN Appl. 201780089313.0 (drafted Oct. 2020, dated Dec. 2020).
Office Action in CN Appl. 201780089342.7 (drafted Nov. 2020, dated Dec. 2020).
Office Action dated Jan. 27, 2021, in German Application No. 11 2017 007 392.8 (with English Translation).
Office Action dated Jan. 27, 2021, in German Application No. 11 2017 007 399.5 (with English Translation).
Office Action dated Jan. 27, 2021, in German Application No. 11 2017 007 397.9 (with English Transiation).
Office Action dated Mar. 17, 2021, in Chinese Application No. 201780089342.7 (with English Translation).
Office Action dated Mar. 17, 2021, in Chinese Application No. 201780089313.0 (with English Translation).

* cited by examiner

FIG. 14

| | | CONTENTS OF ORDER | | |
|---|---|---|---|---|
| WORD ID | ORDER ID | ARTICLE ID | SUPPLY PALLET ID | DELIVERY PALLET ID |
| W_0001 | OD_0001 | L0001 | S_0001 | D_0001 |
| W_0002 | OD_0002 | L0001 | S_0001 | D_0002 |
| W_0003 | OD_0002 | L0002 | S_0002 | D_0002 |
| ... | ... | ... | ... | ... |

CONTROL DEVICE, PICKING SYSTEM, DISTRIBUTION SYSTEM, PROGRAM, AND CONTROL METHOD

CROSS-REFERENCE TO RELATED APPLICATIONS

This application is a continuation of International Patent Application No. PCT/JP2017/014151 filed on Apr. 4, 2017, the contents of which are hereby incorporated herein by reference in its entirety.

BACKGROUND

Technical Field

The subject disclosure relates to a control device, a picking system, a distribution system, a program and a control method.

Background

A picking system has been known, in which a picking hand and a robot arm are used to take out a work stored in a container and arrange the work at a specific position within another container.

CITATION LIST

Patent Literature

[PTL 1]
Japanese Patent Application Publication No. 2016-091053
[PTL 2]
Japanese Patent Application Publication No. 2016-147330
[PTL 3]
Japanese Patent Application Publication No. 2017-033429

SUMMARY

In a case of automatically calculating a trajectory of a work by taking an interference with an obstacle into account, there are numerous amounts of calculation and it is difficult to calculate a trajectory within practical time.

General Disclosure

In a first aspect of the present invention, a control device is provided. The above-described control device may be a control device for controlling a picking apparatus. In the above-described control device, the picking apparatus may arrange, at a second position of a second container, a work picked at a first position of a first container by using a picking hand, the second container being different from the first container. The above-described control device includes a point cloud information acquiring unit for acquiring point cloud information of a region including at least one of the picking hand and the work at a time which is at least one of (i) when a picking hand picks a work at a first position, (ii) when the picking hand moves the work out of a first container, (iii) when the picking hand moves the work in a second container and (iv) when the picking hand arranges the work at a second position, for example. The above-described control device includes an abnormality detection unit for detecting an abnormality based on point cloud information acquired by the point cloud information acquiring unit, for example.

The above-described control device may include an image acquiring unit for acquiring image data of an image including at least one of the picking hand and the work in a field angle at the at least one time. In the above-described control device, the point cloud information acquiring unit may acquire the point cloud information based on the image acquired by the image acquiring unit. In the above-described control device, the point cloud information may be three-dimensional point cloud information.

In the above-described control device, the abnormality detection unit may detect the abnormality based on (i) the point cloud information and (ii) at least one selected from a group including a measurement value for a sensor arranged on the picking apparatus, a control value for at least one of the picking hand, and a robot arm coupled with the picking hand, and at least one of torque, a voltage value and a current value for a driving unit that drives at least one of the picking hand and the robot arm. The above-described control device may include an instruction sending unit for sending, to the picking apparatus, an instruction for suspending the operation of the picking apparatus when the abnormality detection unit for detecting the abnormality.

In a second aspect of the present invention, a picking system is provided. The above-described picking system includes the above-described control device, for example. The above-described picking system includes the above-described picking apparatus, for example.

In a third aspect of the present invention, a distribution system is provided. The above-described distribution system includes the control device, for example. The above-described distribution system includes the picking apparatus, for example. The above-described distribution system includes a conveying apparatus to convey the work, for example.

In a fourth aspect of the present invention, a program is provided. A non-transitory computer-readable medium to store the above-described program may also be provided. The above-described program may be a program to cause a computer to serve as the above-described control device.

In a fourth aspect of the present invention, a control method is provided. The above-described control method may be a control method for controlling a picking apparatus. The above-described control method may be performed by a computer. In the above-described control method, the picking apparatus may arrange, at a second position of a second container, a work picked at a first position of a first container by using a picking hand, the second container being different from the first container. The above-described control method includes a point cloud information acquiring procedure of acquiring point cloud information of a region including at least one of the picking hand and the work at a time which is at least one of (i) when the picking hand picks a work at a first position, (ii) when the picking hand moves the work out of a first container, (iii) when the picking hand moves the work in a second container, and (iv) when the picking hand arranges the work at a second position, for example. The above-described control method includes an abnormality detection procedure of detecting the abnormality based on the point cloud information acquired in the point cloud information acquiring procedure, for example.

The summary clause does not necessarily describe all necessary features of the embodiments of the present invention. The present invention may also be a sub-combination of the features described above.

BRIEF DESCRIPTION OF THE DRAWINGS

FIG. 14 schematically shows one example of a data table 1400.

DESCRIPTION OF EXEMPLARY EMBODIMENTS

Figure 1:
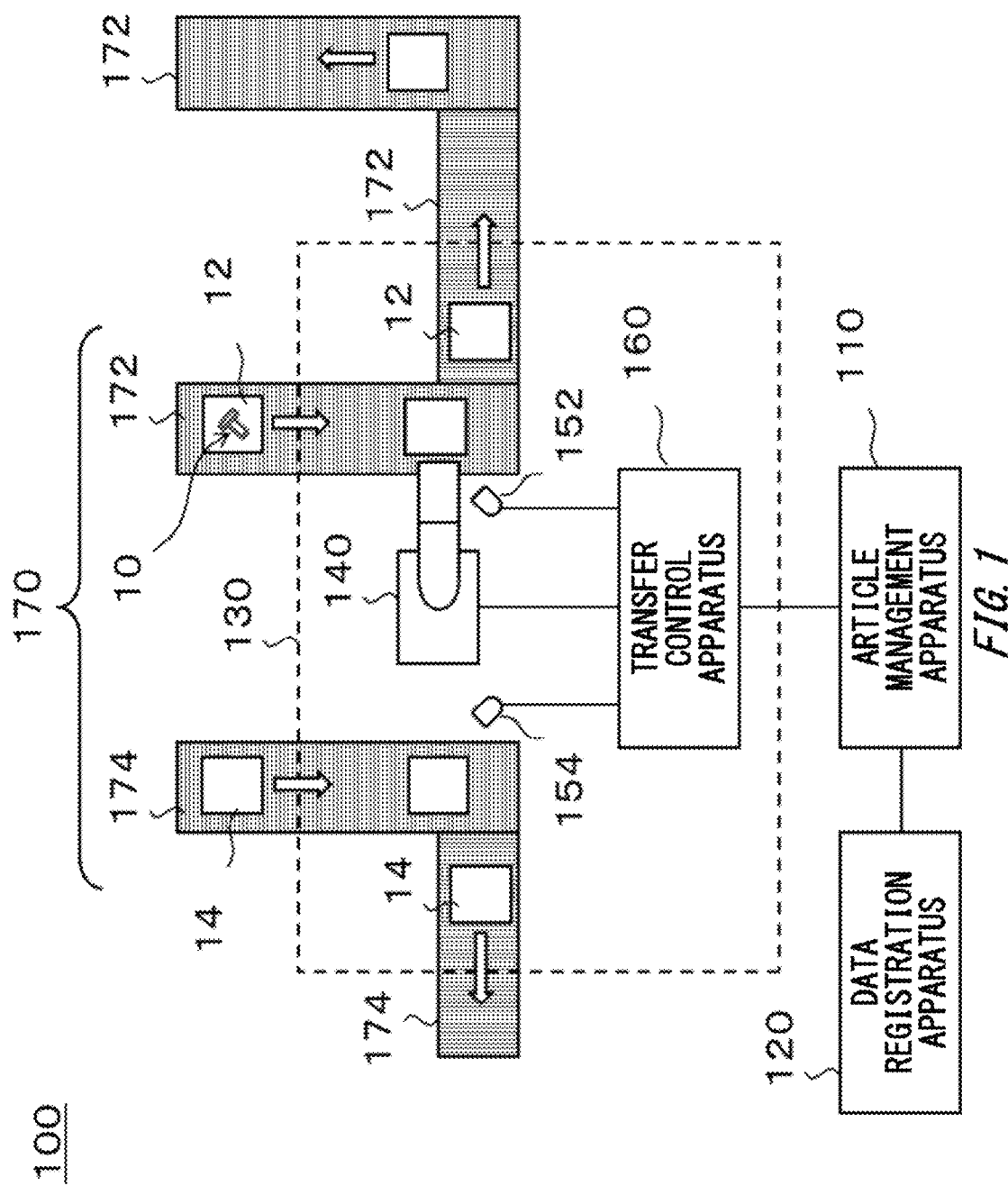
FIG. 1 schematically shows one example of a system configuration of a distribution management system 100.

Hereinafter, (some) embodiment(s) of the present invention will be described. The embodiment(s) do(es) not limit the invention according to the claims, and all the combinations of the features described in the embodiment(s) are not necessarily essential to means provided by aspects of the invention. Note that in the drawings, the same or similar portions are provided with the same reference signs and redundant descriptions may be omitted.

[Summary of Distribution Management System 100]

FIG. 1 schematically shows one example of a system configuration of a distribution management system 100. In the present embodiment, the distribution management system 100 includes an article management apparatus 110, a data registration apparatus 120, a transfer apparatus 130 and a conveying apparatus 170. In the present embodiment, the transfer apparatus 130 includes a robot 140, an image capturing apparatus 152, an image capturing apparatus 154 and a transfer control apparatus 160. In the present embodiment, the conveying apparatus 170 includes a conveyor 172 that conveys the supply pallet 12 and a conveyor 174 that conveys a delivery pallet 14.

The supply pallet 12 may be one example of a first container and a supply container. The delivery pallet 14 may be one example of a second container and an arrangement container. The distribution management system 100 may be one example of a control device, an information processing apparatus, a picking system and a distribution system. The article management apparatus 110 may be one example of a storage apparatus. The data registration apparatus 120 may be one example of the information processing apparatus. The transfer apparatus 130 may be one example of the picking apparatus and the picking system. The robot 140 may be one example of the picking apparatus. The image capturing apparatus 152 may be one example of an image acquiring unit. The image capturing apparatus 154 may be one example of the image acquiring unit. The transfer control apparatus 160 may be one example of the control device and the picking control unit.

In the present embodiment, the distribution management system 100 manages warehousing, storage and shipping of a plurality of types of articles. For example, the distribution management system 100 produces a piece of baggage for delivery by putting a stored article in a container for delivery based on an order from a user.

The baggage for delivery is produced according to the following procedures, for example. First, the conveyor 172 of the conveying apparatus 170 conveys the supply pallet 12, in which an article ordered by a user is stored, to a working position of the transfer apparatus 130. In one embodiment, the supply pallet 12 stores one article. In another embodiment, the supply pallet 12 stores a plurality of articles of the same type. In still another embodiment, the supply pallet 12 stores a plurality of types of articles. Also, the conveyor 174 of the conveying apparatus 170 conveys the delivery pallet 14 to a working position of the transfer apparatus 130.

Next, the transfer apparatus 130 identifies a work 10 that is to be a working target of the transfer apparatus 130 from among the articles stored in the supply pallet 12. Also, the transfer apparatus 130 sets a specific position or any position of the delivery pallet 14 as an arrangement position of the above-described work 10. The transfer apparatus 130 determines a trajectory for moving the work 10 of the supply pallet 12 to the specific position or any position of the delivery pallet 14. The transfer apparatus 130 (i) picks and takes the identified work 10 out of the supply pallet 12, and (ii) arranges the identified work 10 to the specific position or any position of the delivery pallet 14.

When another article ordered by the user has been stored in the above-described supply pallet 12, the transfer apparatus 130 repeats a similar working to the above. When the other article ordered by the user has been stored in another supply pallet 12, the conveyor 172 moves the above-described supply pallet 12 out of the working position of the transfer apparatus 130, and conveys the above-described other supply pallet 12 to the working position of the transfer apparatus 130. The transfer apparatus 130 repeats a similar working to the above with respect to another article stored in another supply pallet 12. Then, as all articles ordered by the user are stored in the delivery pallet 14, the conveyor 174 moves the delivery pallet 14 out of the working position of the transfer apparatus 130. Accordingly, pieces of baggage for delivery can be prepared.

[Summary of Each Unit of Distribution Management System 100]

In the present embodiment, the article management apparatus 110 manages warehousing, storage and shipping of articles. The article management apparatus 110 acquires user order information that indicates order contents of a user. Details of the article management apparatus 110 are described below.

In the present embodiment, the data registration apparatus 120 acquires various information regarding warehoused articles. For example, the data registration apparatus 120 acquires information regarding appearances, shapes, specifications, handling methods and the like. The data registration apparatus 120 may register the acquired information in the article management apparatus 110. The data registration apparatus 120 may also register information about the all warehoused articles, and may also register information per type of articles. Details of the data registration apparatus 120 are described below.

In the present embodiment, the transfer apparatus 130 moves the work 10 from the supply pallet 12 arranged at the working position of the transfer apparatus 130 to the delivery pallet 14 arranged at the working position of the transfer apparatus 130. To simplify the description, in the present embodiment, a case in which a single supply pallet 12 and a single delivery pallet 14 are arranged at the working positions of the transfer apparatus 130 is described. However, the transfer apparatus 130 is not limited to the present embodiment.

In another embodiment, a plurality of supply pallets 12 and one or more delivery pallets 14 are arranged at working positions of the transfer apparatus 130, and the transfer apparatus 130 moves a plurality of works between the plurality of supply pallets 12 and the one or more delivery pallets 14. In still another embodiment, one or more supply pallets 12 and a plurality of delivery pallets 14 are arranged at the working positions of the transfer apparatus 130, and the transfer apparatus 130 moves a plurality of works between the one or more supply pallets 12 and the plurality of delivery pallets 14.

In the present embodiment, the robot 140 moves the work 10 from the supply pallet 12 to the delivery pallet 14 based on an instruction from the transfer control apparatus 160. For example, the robot 140 moves, by using the picking hand, one or more works 10 from one or more supply pallets 12 to one or more delivery pallets 14. The robot 140 may also arrange, at a second position, the work 10 picked at a first position by using the picking hand, the second position being different from the first position. The first position may be a specific position or any position of the supply pallet 12. The second position may be a specific position or any position of the delivery pallet 14. Details of the robot 140 are described below. Note that the expression "one or more" may be referred to as the expression "one or more".

In the present embodiment, the image capturing apparatus 152 captures an image of the supply pallet 12 arranged at the working position of the transfer apparatus 130. The image capturing apparatus 152 may also acquire three-dimensional information (for example, a three-dimensional point cloud) of a surface of the supply pallet 12. The image capturing apparatus 152 may also capture a stereo image of the supply pallet 12. The image capturing apparatus 152 may also acquire temperature information of the supply pallet 12. As the image capturing apparatus 152, a camera, a stereo camera, a three-dimensional sensor and the like can be illustrated. The image capturing apparatus 152 may also include a plurality of image capturing apparatuses.

In the present embodiment, the image capturing apparatus 154 captures an image of the delivery pallet 14 arranged at the working position of the transfer apparatus 130. The image capturing apparatus 154 may also acquire three-dimensional information (for example, a three-dimensional point cloud) of a surface of the delivery pallet 14. The image capturing apparatus 152 may also capture a stereo image of the supply pallet 12. The image capturing apparatus 154 may also acquire temperature information of the delivery pallet 14. As the image capturing apparatus 154, a camera, a stereo camera, a three-dimensional sensor and the like can be illustrated. The image capturing apparatus 154 may also include a plurality of image capturing apparatuses.

In the present embodiment, the transfer control apparatus 160 controls the transfer apparatus 130. In one embodiment, the transfer control apparatus 160 is arranged outside the transfer apparatus 130. In another embodiment, the transfer control apparatus 160 is arranged inside the transfer apparatus 130. Details of the transfer control apparatus 160 are described below.

In the present embodiment, the conveying apparatus 170 conveys one or more works. For example, the conveying apparatus 170 conveys one or more works stored in the supply pallet 12. The conveying apparatus 170 may also convey one or more works stored in the delivery pallet 14.

[Specific Configuration of Each Unit of Distribution Management System 100]

Each unit of the distribution management system 100 may also be realized by hardware, may also be realized by software, and may also be realized by hardware and software. At least some of the respective units of the distribution management system 100 may also be realized by a single server, or may also be realized by a plurality of servers. At least some of the respective units of the distribution management system 100 may also be realized on a virtual server or a cloud system. At least some of the respective units of the distribution management system 100 may also be realized by a personal computer or a mobile terminal. As the mobile terminal, a mobile phone, a smartphone, a PDA, a tablet, a notebook computer or a laptop computer, a wearable computer and the like can be illustrated. Each unit of the distribution management system 100 may also store information by using a distributed inventory technology such as a block chain, or a distributed network.

In a case in which at least some of the components configuring the distribution management system 100 are realized by software, the component realized by the software may be realized by activating software or a program prescribing an operation regarding the component in an information processing apparatus in a general configuration. The above-described information processing apparatus in the general configuration may include: (i) a data processing apparatus having a processor, such as CPU and GPU, a ROM, a RAM, a communication interface and the like; (ii) an input apparatus such as a keyboard, a pointing device, a touch panel, a camera, a sound input apparatus, a gesture input apparatus, various sensors and a GPS receiver; (iii) an output apparatus such as a display apparatus, a sound output apparatus and a vibration apparatus; and (iv) a storage apparatus (including an external storage apparatus) such as a memory, HDD and SSD.

In the above-described information processing apparatus in the general configuration, the above-described data processing apparatus or storage apparatus may store the above-described software or program. The above-described software or program is performed by the processor, and accordingly, causes the above-described information processing apparatus to perform an operation prescribed by the software or program. The above-described software or program may also be stored in a non-transitory computer-readable medium. The above-described software or program may be a program to cause a computer to serve as the transfer control apparatus 160 or a part of the transfer control apparatus 160.

The above-described software or program may be a program to control the picking apparatus. In the above-described program, the picking apparatus may arrange, at a second position, a work picked at a first position by using a picking hand, the second position being different from the above-described first position. The above-described program may be a program to cause a computer to perform a first candidate information acquiring procedure of acquiring first candidate information indicating each of one or more postures that the above-described picking hand can take at the above-described first position. The above-described program may be a program to cause a computer to perform a second candidate information acquiring procedure of acquiring second candidate information indicating each of one or more postures that the above-described picking hand can take at the above-described second position, and an extracting procedure of extracting one combination from among one or more combinations regarding the one or more postures indicated by the above-described first candidate information and the one or more postures indicated by the above-described second candidate information. The above-described program may be a program to cause a computer to perform a trajectory calculating procedure of calculating a trajectory on which (i) the above-described picking hand picks, at the above-described first position, the above-described work with a posture associated with the above-described first position included in the above-described one combination, and (ii) the above-described picking hand arranges, at the above-described second position, the above-described work with a posture associated with the above-described second position included in the above-described one combination. The above-described program may be a program to cause a computer to perform a determining procedure of determining whether an interference is present or absent on the trajectory that is calculated in the above-described trajectory calculating procedure.

The above-described software or program may be a program to control the picking apparatus. In the above-described program, the picking apparatus may arrange, at a second position of a second container, a work picked at a first position of a first container by using a picking hand, the second container being different from the above-described first container. The above-described program may be a program to cause a computer to perform a trajectory information generating procedure of generating trajectory information prescribing a trajectory on which (i) the above-described picking hand picks, at the above-described first position, the above-described work with a posture associated with the above-described first position included in the above-described one combination, and (ii) the picking hand arranges, at the above-described second position, the above-described work with a posture associated with the above-described second position included in the above-described one combination. The above-described program may be a program to cause a computer to perform an execution control procedure to operate the above-described picking apparatus based on the trajectory information generated in the above-described trajectory information procedure. The above-described program may be a program to cause a computer to perform an execution time estimating procedure of estimating a period of time that is from a time when the above-described picking apparatus receives an instruction for starting an operation on the above-described work to a time when the operation of the above-described picking apparatus on the above-described work is ended in the above-described execution control procedure. In the above-described program, the above-described trajectory information generating procedure may also include a procedure of adjusting the amount of calculation based on an estimation result obtained in the above-described execution time estimating procedure.

The above-described software or program may be a program to control the picking apparatus. In the above-described program, the picking apparatus may arrange, at a second position of a second container, a work picked at a first position of a first container by using a picking hand, the second container being different from the above-described first container. The above-described program may be a program to cause a computer to perform a point cloud information acquiring procedure of acquiring point cloud information of a region including at least one of the above-described picking hand and the above-described work at a time being at least one of (i) when the above-described picking hand picks the above-described work at the above-described first position, (ii) when the above-described picking hand moves the above-described work out of the above-described first container, (iii) when the above-described picking hand moves the above-described work in the above-described second container, and (iv) when the above-described picking hand arranges the above-described work at the above-described second position. The above-described program may be a program to cause a computer to perform an abnormality detection procedure of detecting abnormality based on the point cloud information acquired in the above-described point cloud information acquiring procedure.

The above-described software or program may be a program to control the picking apparatus. In the above-described program, the picking apparatus may move, by using a picking hand, one or more works from one or more supply containers to one or more arrangement containers. The above-described program may be a program to cause a computer to perform a trajectory information generating procedure of generating trajectory information prescribing a trajectory on which the above-described picking hand picks one of the above-described one or more works stored in one supply container included in the above-described one or more supply containers and arranges the work of the above-described one or more works to one arrangement container included in the above-described one or more arrangement containers. In the above-described program, after performing a process of generating trajectory information regarding a first work included in the above-described one or more works and before completing moving the above-described first work, the above-described trajectory information generating procedure may include a procedure of generating trajectory information regarding a second work being included in the above-described one or more works and being different from the above-described first work by using an operation result in the process of generating the trajectory information regarding the above-described first work.

The above-described software or program may be a program to control the picking apparatus. In the above-described program, the picking apparatus may move, by using the picking hand, one or more works to one or more supply containers or one or more arrangement containers. The above-described program may be a program to cause a computer to perform a trajectory information generating procedure of generating trajectory information prescribing a trajectory on which the above-described picking hand picks one of the above-described one or more works stored in one supply container included in the above-described one or more supply containers and arranges the one or more works in one arrangement container included in the above-described one or more arrangement containers. In the above-described program, after performing the process of generating the trajectory information regarding a first work included in the above-described one or more works and before completing moving the above-described first work, the above-described trajectory information generating procedure may have a procedure of generating trajectory information regarding a second work being included in the above-described one or more works and being different from the above-described first work by using an operation result in the process of generating trajectory information regarding the above-described first work.

The above-described software or program may be a program to cause a computer to perform a three-dimensional information acquiring procedure of acquiring three-dimensional information of a target object. The above-described software or program may be a program to cause a computer to perform a holding information acquiring procedure of acquiring holding information that defines a method of holding the above-described target object by using the picking hand. The above-described software or program may be a program to cause a computer to perform an information management procedure of storing, in a storage apparatus, (i) three-dimensional information of the above-described target object acquired by the above-described three-dimensional information acquiring unit and (ii) holding information acquired by the above-described holding information acquiring unit in association with each other.

Figure 2:
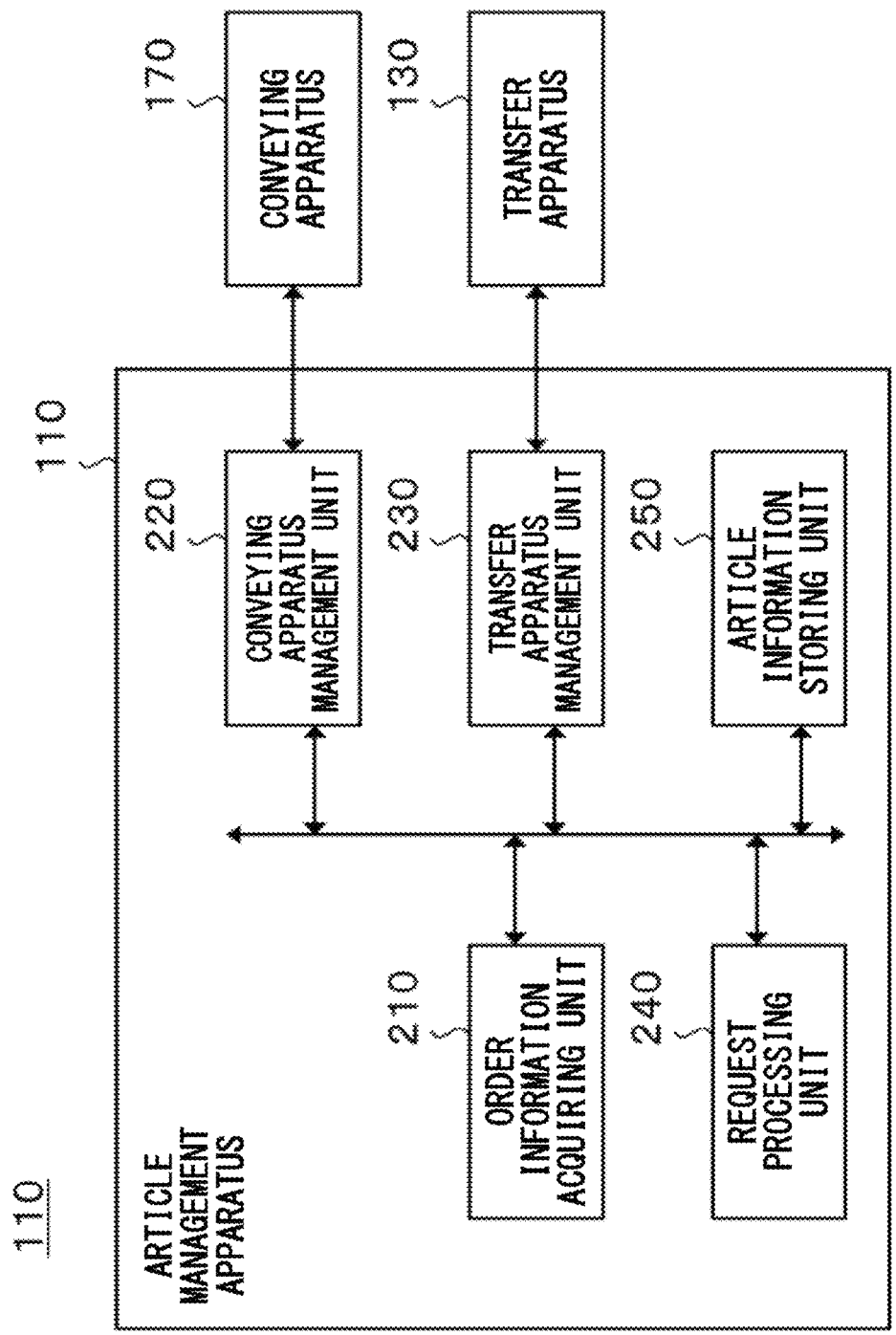
FIG. 2 schematically shows one example of an internal configuration of an article management apparatus 110.

FIG. 2 schematically shows one example of an internal configuration of an article management apparatus 110. In the present embodiment, the article management apparatus 110 includes an order information acquiring unit 210, a conveying apparatus management unit 220, a transfer apparatus management unit 230, a request processing unit 240 and an article information storing unit 250. The order information acquiring unit 210 may be one example of an order information acquiring unit. The article information storing unit 250 may be one example of the storage apparatus.

In the present embodiment, the order information acquiring unit 210 acquires user order information indicating order contents of a user. The user order information may include identification information of an article that is to be a working target of the transfer apparatus 130. As the identification information of the article, a name of the article, a code number added to the article, a feature of an appearance of the article and the like can be illustrated. The user order information may be one example of the order information.

In one embodiment, the order information acquiring unit 210 receives an order from a user via an input apparatus (not shown in the drawings) such as a keyboard, a touch panel, a sound input apparatus and a gesture input apparatus that are arranged in the article management apparatus 110. In another embodiment, the order information acquiring unit 210 receives the user order information via a communication network from a communication terminal or another information processing apparatus of a user. The communication network may be a wired communication transmission path, may be a wireless communication transmission path, and may also be a combination of a wireless communication transmission path and a wired communication transmission path.

In the present embodiment, the conveying apparatus management unit 220 manages the conveying apparatus 170. In one embodiment, the conveying apparatus management unit 220 transfers the user order information acquired by the order information acquiring unit 210 to the conveying apparatus 170. In another embodiment, the conveying apparatus management unit 220 may analyze the user order information from one or more users to check inventory states of articles included in the user order information. In still another embodiment, the conveying apparatus management unit 220 may analyze the user order information from one or more users, and if multiple types of articles are included in the user order information, the conveying apparatus management unit 220 may determine a conveying sequence of the multiple types of articles to the transfer apparatus 130 based on an inventory position of each article such that the entire conveying efficiency satisfies a predetermined condition.

In the present embodiment, the transfer apparatus management unit 230 manages the transfer apparatus 130. In one embodiment, the transfer apparatus management unit 230 may analyze the user order information, and if multiple types of articles are included in the user order information, the transfer apparatus management unit 230 may determine a picking sequence of the multiple types of articles to the transfer apparatus 130 such that working efficiency of the transfer apparatus 130 satisfies a predetermined condition. If the conveying apparatus management unit 220 determines the conveying sequence of the multiple types of articles to the transfer apparatus 130, the transfer apparatus management unit 230 may determine the picking sequence of the multiple types of articles to the transfer apparatus 130 while taking the conveying sequence into account. In another embodiment, the transfer apparatus management unit 230 transfers the user order information acquired by the order information acquiring unit 210 to the transfer apparatus 130. In this case, the transfer apparatus 130 may also analyze the user order information to determine the picking sequence of the multiple types of articles to the transfer apparatus 130.

In the present embodiment, the request processing unit 240 receives various requests. The request processing unit 240 processes the received requests. In one embodiment, the request processing unit 240 receives a registration request of data regarding an article from the data registration apparatus 120. As the request processing unit 240 receives the above-described registration request, the request processing unit 240 checks, for example, whether or not the data of the article to be registered has already been stored in the article information storing unit 250. If the above-described data is not stored in the article information storing unit 250, the request processing unit 240 stores the above-described data in the article information storing unit 250. In a case where the above-described data has been stored in the article information storing unit 250, if the contents of the data have been changed the request processing unit 240 updates the above-described data. On the other hand, the request processing unit 240 ends the processing if the contents of the data are not changed.

In another embodiment, the request processing unit 240 receives, from the transfer control apparatus 160, a sending request of data matched with a specific condition. As the request processing unit 240 receives the above-described sending request, the request processing unit 240 accesses, for example, to the article information storing unit 250 to check whether the data matched with the condition is present or absent. If the data matched with the above-described condition has been stored in the article information storing unit 250, the request processing unit 240 sends the data to the transfer control apparatus 160. If the data matched with the above-described condition is not stored in the article information storing unit 250, the request processing unit 240 sends information indicating that no data exists to the transfer control apparatus 160.

In the present embodiment, the article information storing unit 250 stores various information regarding an article. The article information storing unit 250 may store the information acquired by the data registration apparatus 120.

Figure 3:
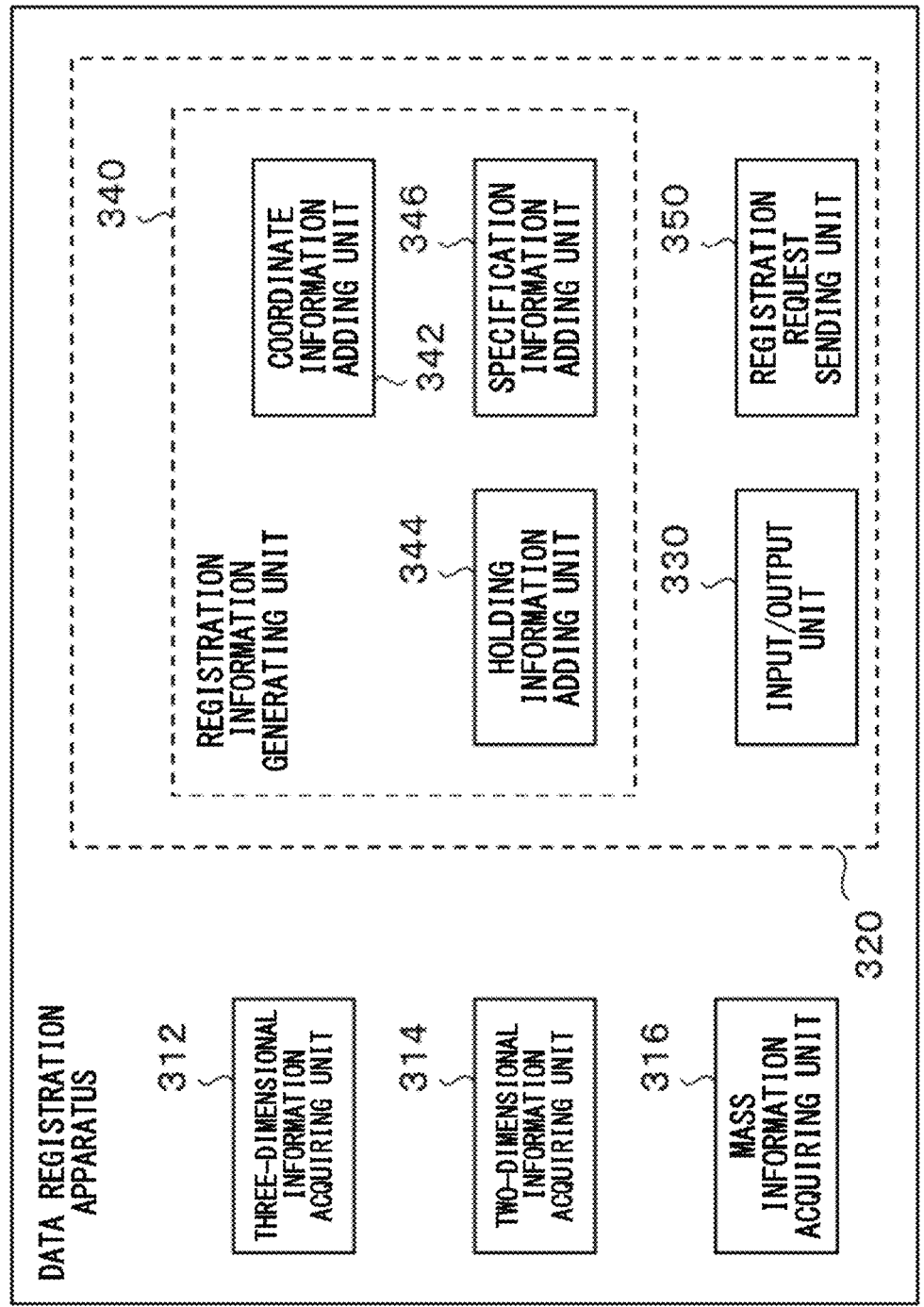
FIG. 3 schematically shows one example of an internal configuration of a data registration apparatus 120.

FIG. 3 schematically shows one example of an internal configuration of the data registration apparatus 120. In the present embodiment, the data registration apparatus 120 includes a three-dimensional information acquiring unit 312, a two-dimensional information acquiring unit 314, a mass information acquiring unit 316 and an article information registration unit 320. In the present embodiment, the article information registration unit 320 includes an input/output unit 330, a registration information generating unit 340 and a registration request sending unit 350. In the present embodiment, the registration information generating unit 340 includes a coordinate information adding unit 342, a holding information adding unit 344 and a specification information adding unit 346.

The article information registration unit 320 may be one example of the information management unit. The holding information adding unit 344 may be one example of the holding information acquiring unit. The specification information adding unit 346 may be one example of the feature information acquiring unit. The registration request sending unit 350 may be one example of the information management unit.

In the present embodiment, the three-dimensional information acquiring unit 312 acquires three-dimensional information of a target article that is to be a target of data registration processing. The three-dimensional information may include at least one of home position information and coordinate axis information. The three-dimensional information may also include CAD data of the target article. The three-dimensional information may also include data obtained by three-dimensionally measuring the target article. The target article may be one example of the target object. The three-dimensional information acquiring unit 312 may also be (i) a three-dimensional measurement apparatus in any manner and may also be (ii) a communication interface or a storage apparatus to receive three-dimensional information from the three-dimensional measurement apparatus or another information processing apparatus.

In the present embodiment, the two-dimensional information acquiring unit 314 acquires two-dimensional information of a target article that is to be a target of the data registration processing. The two-dimensional information may include CAD data of the target article. The two-dimensional information may include image data of three or more images obtained by capturing the images of the target article from three or more directions. The two-dimensional information may include image data of four or more images obtained by capturing the images of the target article from four or more directions. The two-dimensional information may include image data of five or more images obtained by capturing the images of the target article from five or more directions. The two-dimensional information may include image data of six or more images obtained by capturing the images of the target article from six or more directions. The two-dimensional information acquiring unit 314 may also be (i) an image capturing apparatus in any manner, and may also be (ii) a communication interface or a storage apparatus to receive two-dimensional information from the image capturing apparatus or another information processing apparatus.

In the present embodiment, the mass information acquiring unit 316 acquires mass information indicating the mass of the target article. The mass information may also include information of a center of gravity indicating a position of the center of gravity of the target article. The mass information acquiring unit 316 may also be (i) a mass measurement apparatus in any manner, and may also be (ii) a communication interface or a storage apparatus to receive mass information from the mass measurement apparatus or another information processing apparatus.

In the present embodiment, the article information registration unit 320 stores, in the article information storing unit 250, (i) the three-dimensional information of the target article acquired by the three-dimensional information acquiring unit 312 and (ii) various information regarding the target article in association with each other. For example, the article information registration unit 320 sends, to the article management apparatus 110, a request for storing (i) the three-dimensional information of the target article acquired by the three-dimensional information acquiring unit 312 and (ii) various information regarding the target article in the article information storing unit 250.

In the present embodiment, the input/output unit 330 receives an input from a user. Also, the input/output unit 330 outputs information to the user. The input/output unit 330 includes an input apparatus such as a keyboard, a pointing device, a touch panel, a camera, a sound input apparatus, a gesture input apparatus, various sensors and a GPS receiver, for example. The input/output unit 330 may also be a communication interface with an external storage apparatus. The input/output unit 330 may also be a communication interface for sending and receiving information to/from another information processing apparatus via a communication line. Accordingly, information regarding a target article can be acquired by accessing to a website in which a manufacturer or seller of the target article provides a service, for example. The input/output unit 330 includes an output apparatus such as a display apparatus, a sound output apparatus and a vibration apparatus, for example. Accordingly, an input screen for the user to input the information regarding the target article can be presented to the user, for example.

In the present embodiment, the registration information generating unit 340 generates information that is to be registered in the article management apparatus 110. For example, the registration information generating unit 340 adds various information to at least one of the three-dimensional information of the target article acquired by the three-dimensional information acquiring unit 312, the two-dimensional information of the target article acquired by the two-dimensional information acquiring unit 314 and the mass information of the target article acquired by the mass information acquiring unit 316, to generate the information to be registered in the article management apparatus 110.

In the present embodiment, the coordinate information adding unit 342 adds at least one of the home position information and the coordinate axis information to at least one of the three-dimensional information of the target article acquired by the three-dimensional information acquiring unit 312 and the two-dimensional information of the target article acquired by the two-dimensional information acquiring unit 314. The coordinate information adding unit 342 may also acquire at least one of the home position information and the coordinate axis information from the input/output unit 330.

In the present embodiment, the holding information adding unit 344 adds holding information defining a method of holding the target article by using the picking hand to at least one of the three-dimensional information of the target article acquired by the three-dimensional information acquiring unit 312 and the two-dimensional information of the target article acquired by the two-dimensional information acquiring unit 314.

In one embodiment, the holding information adding unit 344 determines a method of holding the target article by acquiring the holding information from the input/output unit 330. In another embodiment, the holding information adding unit 344 determines the method of holding the target article based on (i) a shape of the target article and (ii) information associating a typical shape of the article with the method of holding the article.

In the present embodiment, the specification information adding unit 346 adds specification information indicating a specification of the target article to at least one of the three-dimensional information of the target article acquired by the three-dimensional information acquiring unit 312 and the two-dimensional information of the target article acquired by the two-dimensional information acquiring unit 314. As the specification of the target article, (i) a name of the article, (ii) an identification code added to the article, (iii) a dimension of the article, (iv) the mass of the article, (v) matters regarding storage, transportation or usage of the article and the like can be illustrated.

In one embodiment, the specification information adding unit 346 may acquire the specification information from the input/output unit 330. In another embodiment, the specification information adding unit 346 may acquire, based on at least one of the three-dimensional information acquired by the three-dimensional information acquiring unit 312 and the two-dimensional information acquired by the two-dimensional information acquiring unit 314, feature information for recognizing the target article and include the feature information in the specification information. The specification information adding unit 346 may use a method used in an image recognition field such as face recognition and living body recognition to acquire the feature information.

The feature information may be information regarding a feature of at least parts of the appearance of the target article. As the feature of the appearance of the target article, (i) a feature regarding at least one of a shape, a pattern and a color of the target article, (ii) a logo mark added to a target article, a name of the article or an identification code to identify the article and the like can be illustrated.

Accordingly, the registration information generating unit 340 can generate the information that is to be registered in the article management apparatus 110. Note that the information that is to be registered in the article management apparatus 110 may at least include at least one of the three-dimensional information of the target article acquired by the three-dimensional information acquiring unit 312 and the two-dimensional information of the target article acquired by the two-dimensional information acquiring unit 314, or may not include the mass information, the coordinate information, the holding information and the specification information.

In one embodiment, the information to be registered in the article management apparatus 110 includes the three-dimensional information and the holding information of the target article. The information to be registered in the article management apparatus 110 may also include (i) the three-dimensional information and the holding information of the target article and (ii) at least one of the feature information and the identification information of the target article. The information to be registered in the article management apparatus 110 may also include (i) the three-dimensional information and the holding information of the target article and (ii) at least one of the mass information, the coordinate information and the specification information of the target article. The information to be registered in the article management apparatus 110 may also include (i) the three-dimensional information and the holding information of the target article, (ii) at least one of the feature information and the identification information of the target article, and (iii) at least one of the mass information, the coordinate information and the specification information of the target article.

In another embodiment, the information to be registered in the article management apparatus 110 includes the three-dimensional information, the two-dimensional information and the holding information of the target article. The information to be registered in the article management apparatus 110 may also include (i) the three-dimensional information, the two-dimensional information and the holding information of the target article, and (ii) at least one of the feature information and the identification information of the target article. The information that is to be registered in the article management apparatus 110 may also include (i) the three-dimensional information, the two-dimensional information and the holding information of the target article, and (ii) at least one of the mass information, the coordinate information and the specification information of the target article. The information that is to be registered in the article management apparatus 110 may also include (i) the three-dimensional information, the two-dimensional information and the holding information of the target article, (ii) at least one of the feature information and the identification information of the target article, and (iii) at least one of the mass information, the coordinate information and the specification information of the target article.

In the present embodiment, the registration request sending unit 350 stores the registration information generated by the registration information generating unit 340 in the article management apparatus 110. For example, the registration request sending unit 350 sends, to the article management apparatus 110, a registration request for storing the registration information generated by the registration information generating unit 340 in the article information storing unit 250.

In the present embodiment, a case in which the article information storing unit 250 that is where the registration information is to be registered is arranged in the article management apparatus 110 is described. However, the article information storing unit 250 is not limited to the present embodiment. In another embodiment, the article information storing unit 250 may also be arranged in the data registration apparatus 120.

Figure 4:
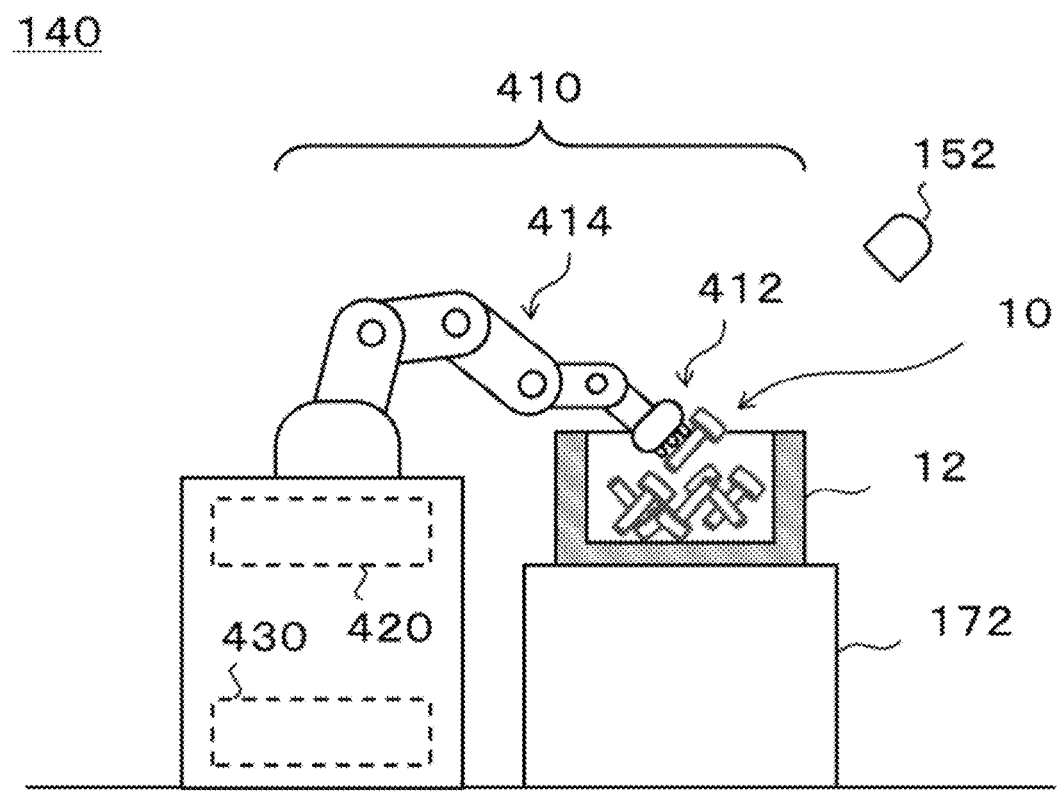
FIG. 4 schematically shows one example of an internal configuration of a robot 140.

FIG. 4 schematically shows one example of an internal configuration of a robot 140. In the present embodiment, the robot 140 includes a manipulator 410, a driving unit 420 and a drive control unit 430. In the present embodiment, the manipulator 410 includes a picking hand 412 and a robot arm 414.

In the present embodiment, the picking hand 412 holds the work 10. The holding manner of the picking hand 412 is not particularly limited. As the holding manner of the picking hand 412, a manner of attracting the work 10 with a low pressure, a manner of holding the work 10 by a plurality of finger modules and the like can be illustrated. The picking hand 412 may also be exchanged in accordance with the working contents. The picking hand 412 may have various sensors such as a contact sensor, a mass measurement sensor and a load measurement sensor.

In the present embodiment, the robot arm 414 is coupled with the picking hand 412 to adjust a position and a posture of the picking hand 412. Although the structure of the robot arm 414 is not particularly limited, a multijoint robot arm having a plurality of joints is used, for example. The robot arm 414 may have various sensors such as a mass measurement sensor and a load measurement sensor. The load measurement sensor may be a sensor to measure torque, a current value or a voltage value for the driving unit 420 that drives each joint of the robot arm 414.

In the present embodiment, the driving unit 420 drives the manipulator 410. In one embodiment, the driving unit 420 drives the picking hand 412. For example, the driving unit 420 supplies air to the picking hand 412, or sucks air from the picking hand 412. In another embodiment, the driving unit 420 drives the robot arm 414. For example, the driving unit 420 adjusts an angle of each joint of the robot arm 414. The driving unit 420 may be a motor. The driving unit 420 may have a plurality of motors.

In the present embodiment, the drive control unit 430 controls the driving unit 420. For example, the drive control unit 430 receives, from the transfer control apparatus 160, an instruction for controlling an operation of the robot 140. The drive control unit 430 controls the driving unit 420 based on the instruction from the transfer control apparatus 160. The instruction for controlling the operation of the robot 140 may be information indicating a trajectory of the picking hand 412.

As the information indicating the trajectory of the picking hand 412, (i) information indicating an initial arrangement, a passing arrangement, a final arrangement and move time of the picking hand 412, (ii) information indicating an angle of each joint and move time of the robot arm 414 in the initial arrangement, the passing arrangement and the final arrangement, (iii) information indicating an arrangement of the picking hand 412 at each time during the move time, (iv) information indicating an angle of each joint of the robot arm 414 at each time during the move time, and the like can be illustrated. The arrangement of the picking hand 412 may be identified by the position and the posture of the picking hand 412, for example.

Figure 5:
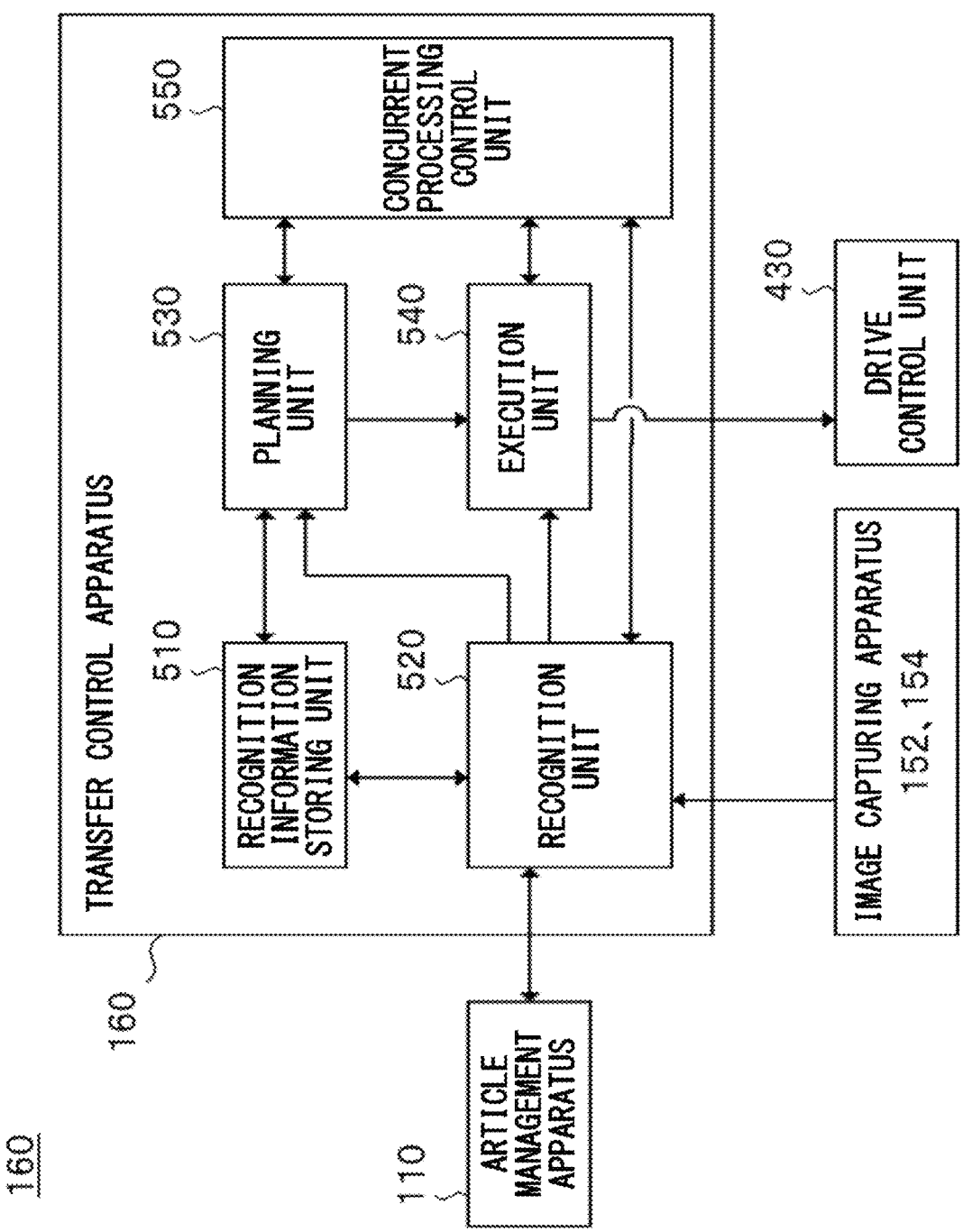
FIG. 5 schematically shows one example of an internal configuration of a transfer control apparatus 160.

FIG. 5 schematically shows one example of an internal configuration of the transfer control apparatus 160. In the present embodiment, the transfer control apparatus 160 includes a recognition information storing unit 510, a recognition unit 520, a planning unit 530, an execution unit 540 and a concurrent processing control unit 550.

The recognition information storing unit 510 may be one example of the holding information storing unit. The recognition unit 520 may be one example of the order information acquiring unit, the image acquiring unit, the point cloud information acquiring unit, the holding information extracting unit and the container information acquiring unit. The planning unit 530 may be one example of the control device and the trajectory information generating unit. The execution unit 540 may be one example of the control device and the execution control unit. The concurrent processing control unit 550 may be one example of the execution time estimating unit and the constraint condition setting unit.

In the present embodiment, the recognition information storing unit 510 stores various information regarding the recognition processing in the recognition unit 520. In one embodiment, the recognition information storing unit 510 stores information that is used for the recognition processing in the recognition unit 520. For example, the recognition information storing unit 510 stores the identification information to identify each of one or more types of articles and at least one of the three-dimensional information, the two-dimensional information and the feature information of each article in association with each other. Accordingly, the recognition unit 520 can recognize articles stored in the supply pallet 12 and recognize a work 10 that is to be a working target of the transfer apparatus 130 from among the identified articles.

The recognition information storing unit 510 may further store at least one of the home position information, the coordinate axis information, the holding information and the specification information of each article. These pieces of information are used by the planning unit 530, for example. For example, the recognition information storing unit 510 stores the identification information to identify each of one or more types of articles, at least one of the three-dimensional information, the two-dimensional information and the feature information of each article, and at least one of the home position information, the coordinate axis information, the holding information and the specification information of each article in association with each other.

In another embodiment, the recognition information storing unit 510 stores the information obtained by the recognition processing in the recognition unit 520. For example, the recognition information storing unit 510 stores (i) a recognition result of each of one or more supply pallets 12 arranged at working positions of the transfer apparatus 130, (ii) a recognition result of an article stored in each of the one or more supply pallets 12, (iii) a recognition result of a work 10 that is to be the working target of the transfer apparatus 130 among the recognized articles, (iv) a point cloud of surfaces of the one or more supply pallets 12, (v) a recognition result of each of one or more delivery pallets 14 arranged at working positions of the transfer apparatus 130, (vi) a recognition result of an article stored in each of the one or more delivery pallets 14, (vii) a recognition result of the being-transferred work 10 on each of the one or more delivery pallets 14, (viii) a point cloud of the surfaces of the one or more delivery pallets 14, and the like. The above-described point cloud may be a three-dimensional point cloud.

The recognition information storing unit 510 may store information required for the working of the transfer apparatus 130 among the information regarding the articles being stored in the article information storing unit 250. For example, the recognition information storing unit 510 stores information regarding the article that was previously the working target of the transfer apparatus 130, information regarding the article that is often the working target of the transfer apparatus 130, information regarding an article that is scheduled to be the working target of the transfer apparatus 130, information regarding an article that is estimated to be the working target of the transfer apparatus 130 in a near future according to a previous working history, and the like. Accordingly, the recognition unit 520 can extract target information at high speed.

The recognition information storing unit 510 may be realized by a medium being different from the article information storing unit 250 that is where the data acquired by the data registration apparatus 120 is to be registered. For example, the recognition information storing unit 510 is realized by a medium to which the recognition unit 520 can access at higher speed than the article information storing unit 250. Accordingly, the recognition unit 520 can extract the target information at high speed.

In the present embodiment, the recognition unit 520 performs the recognition processing. For example, the planning unit 530 acquires the working information indicating the working contents of the transfer apparatus 130 from the article management apparatus 110. The working information includes the information indicating the picking sequence of the one or more articles to the transfer apparatus 130, for example. The working information may also be the user order information. The working information may be one example of the order information. Also, the recognition unit 520 acquires, from the image capturing apparatus 152 and the image capturing apparatus 154, image data of each of the one or more supply pallets 12 and the one or more delivery pallets 14 arranged at the working positions of the transfer apparatus 130.

In the present embodiment, the recognition unit 520 recognize, with reference to the information stored in the recognition information storing unit 510 or the article information storing unit 250, the supply pallets 12, the articles stored in the supply pallets 12, the delivery pallets 14, the articles stored in the delivery pallets 14 and the work 10 being the working target of the transfer apparatus 130. The recognition unit 520 may send the information indicating the recognition result to the planning unit 530. The recognition unit 520 may send the information indicating the recognition result to the execution unit 540. The recognition unit 520 may store the information indicating the recognition result in the recognition information storing unit 510. Details of the recognition unit 520 are described below.

In the present embodiment, the planning unit 530 performs the planning processing. For example, the planning unit 530 creates a working plan of the transfer apparatus 130. More specifically, the planning unit 530 generates trajectory information prescribing a trajectory on which the picking hand 412 picks the work 10 stored in a specific supply pallet 12 and arranges the work on a specific delivery pallet 14. The specific supply pallet 12 may be one example of one supply container included in one or more supply containers. The specific delivery pallet 14 may be one example of one arrangement container included in one or more arrangement containers.

The trajectory information prescribes a trajectory on which the picking hand 412 picks the work 10 at a first position and arranges the work at a second position, for example. The second position may be a position being different from the first position. The first position may be any position or a specific position of the supply pallet 12. The second position may be any position or a specific position of the delivery pallet 14.

In the present embodiment, the planning unit 530 generates the trajectory information based on the working information from the article management apparatus 110 and the recognition result of the recognition unit 520 with reference to the holding information stored in the recognition information storing unit 510 or the article information storing unit 250. Accordingly, the planning unit 530 can create a working plan of the transfer apparatus 130. The planning unit 530 may generate control information for controlling at least one of the picking hand 412 and the robot arm 414 based on the generated trajectory information. The planning unit 530 may send the generated control information to the execution unit 540. Details of the planning unit 530 are described below.

In the present embodiment, the execution unit 540 performs the execution processing. For example, the execution unit 540 receives the control information from the planning unit 530. The execution unit 540 sends the control information to the drive control unit 430 of the robot 140 to operate the robot 140 based on the trajectory information generated by the planning unit 530. Also, the execution unit 540 monitors the operation of the robot 140, the supply pallet 12 and the delivery pallet 14. The control information may be one example of an instruction to the robot 140. The control information may be one example of an instruction for causing the robot 140 to start an operation on the work 10. Details of the execution unit 540 are described below.

In the present embodiment, the recognition unit 520 may perform concurrently or in parallel parts of a plurality of steps configuring the recognition processing. Similarly, the planning unit 530 may perform concurrently or in parallel parts of a plurality of steps configuring the planning processing. The execution unit 540 may perform concurrently or in parallel parts of a plurality of steps configuring the execution processing. Also, the transfer control apparatus 160 may perform concurrently or in parallel the recognition processing, the planning processing and the execution processing regarding a plurality of works 10. For example, the transfer control apparatus 160 performs planning processing of a second work and recognition processing of a third work while performing execution processing of a first work. The above-described concurrent processing or parallel processing can be realized by a pipeline processing technology, for example.

In the present embodiment, the concurrent processing or concurrent processing control unit 550 controls the parallel processing in the transfer control apparatus 160. In one embodiment, the concurrent processing control unit 550 controls the concurrent processing or parallel processing in each of the recognition unit 520, the planning unit 530 and the execution unit 540. In another embodiment, in a case in which the transfer control apparatus 160 performs concurrently or in parallel the processing regarding the plurality of works 10, the concurrent processing control unit 550 controls the recognition unit 520, the planning unit 530 and the execution unit 540 such that the information can be smoothly exchanged between the recognition unit 520, the planning unit 530 and the execution unit 540.

First Embodiment of Controlling Other Elements by Concurrent Processing Control Unit 550

In one embodiment, the concurrent processing control unit 550 estimates a period of time that is from a time when the robot 140 receives the control information for starting the operation on the work 10 to a time when the operation of the robot 140 on the work 10 is ended. For example, the trajectory information includes information regarding (i) an initial position and an initial posture of the picking hand 412, (ii) a position and a posture of the picking hand 412 picking the work 10 on the supply pallet 12, (iii) a position and a posture of the picking hand 412 arranging the work 10 on the delivery pallet 14, and (iv) move time of the work 10. Here, the concurrent processing control unit 550 may estimate the above-described time based on the trajectory information generated by the planning unit 530.

The concurrent processing control unit 550 may determine a constraint condition regarding an amount or duration time of calculation of the processing in at least one of the recognition unit 520, the planning unit 530 and the execution unit 540 based on the above-described estimation result. For example, the concurrent processing control unit 550 determines the constraint condition regarding the amount or duration time of calculation of the processing in at least one of a plurality of steps configuring the recognition processing in the recognition unit 520 based on the above-described estimation result. The recognition unit 520 may adjust the amount or duration time of calculation based on the above-described constraint condition. Similarly, the concurrent processing control unit 550 may determine the constraint condition regarding the amount or duration time of calculation of the processing in at least one of a plurality of steps configuring the planning processing in the planning unit 530 based on the above-described estimation result. The planning unit 530 may adjust the amount or duration time of calculation based on the above-described constraint condition.

The constraint condition may be at least one of (i) the maximum value of an amount or duration time of calculation that is until progress of each processing reaches a preset milestone and (ii) the maximum value of an amount or duration time of calculation that is until each processing is completed. The above-described maximum value may be determined based on the above-described estimation result.

For example, in a case in which the transfer control apparatus 160 performs the planning processing of the second work and the recognition processing of the third work while performing the execution processing of the first work, the concurrent processing control unit 550 determines the maximum value of the amount or duration time of calculation of the planning processing of the second work such that the planning processing of the second work in the planning unit 530 is ended before the above-described estimate time is expired or elapsed. Accordingly, the trajectory information or control information regarding the second work can be generated before the execution processing of the first work in the execution unit 540 is ended.

Similarly, the concurrent processing control unit 550 may determine the maximum value of the amount or duration time of calculation of the recognition processing of the third work such that the recognition processing of the third work in the recognition unit 520 is ended before the planning processing of the second work in the planning unit 530 is ended. The concurrent processing control unit 550 may also determines the maximum value of the amount or duration time of calculation of the recognition processing of the third work such that the recognition processing of the third work in the recognition unit 520 ends before the execution processing of the first work in the execution unit 540 is ended.

Second Embodiment of Controlling Other Elements by Concurrent Processing Control Unit 550

In another embodiment, the concurrent processing control unit 550 adjusts the time between the processing in the recognition unit 520, the processing in the planning unit 530 and the processing in the execution unit 540. For example, the concurrent processing control unit 550 adjusts the time between the recognition processing in the recognition unit 520 and the execution processing in the execution unit 540. More specifically, the concurrent processing control unit 550 adjusts the time between a step in which the recognition unit 520 acquires the point cloud information and a step in which the execution unit 540 detects the abnormality.

For example, in a case in which the transfer control apparatus 160 performs the planning processing of the second work and the recognition processing of the third work while performing the execution processing of the first work, the execution unit 540 acquires the point cloud information of the supply pallet 12 in periods of time that are before and after the picking hand 412 picks the first work, to determine whether the abnormality is present or absent. Also, the execution unit 540 acquires the point cloud information of the delivery pallet 14 in periods of time that are before and after the picking hand 412 arranges the first work, to determine whether the abnormality is present or absent. Accordingly, occurrence of the abnormality can be rapidly detected. On the other hand, in the recognition processing of the recognition unit 520, for example, the process of recognizing the third work and the process of acquiring the point cloud information of the supply pallet 12 or the delivery pallet 14 are performed concurrently. Because the duration time of calculation for the process of acquiring the point cloud information is shorter compared to the process of recognizing the work, the recognition unit 520 can perform the process of acquiring the point cloud information for multiple times while performing the process of recognizing the work.

Here, the concurrent processing control unit 550 controls the recognition unit 520, for example, to adjust the time at which the recognition unit 520 starts the step of acquiring the point cloud information of the supply pallet 12 or the delivery pallet 14 in accordance with the progress of the execution processing of the first work by the execution unit 540. According to one embodiment, the concurrent processing control unit 550 estimates the time at which the picking hand 412 picks the first work or estimates the picking hand 412, to control the recognition unit 520 such that the recognition unit 520 starts the step of acquiring the point cloud information in accordance with the time. The concurrent processing control unit 550 may estimate the above-described time based on the trajectory information generated by the planning unit 530. According to another embodiment, at the time when the picking hand 412 picks the first work or the time when the picking hand 412 arranges the first work, if the step of acquiring the point cloud information is being performed, the recognition unit 520 suspends the step and newly starts the process of acquiring the point cloud information.

Figure 6:
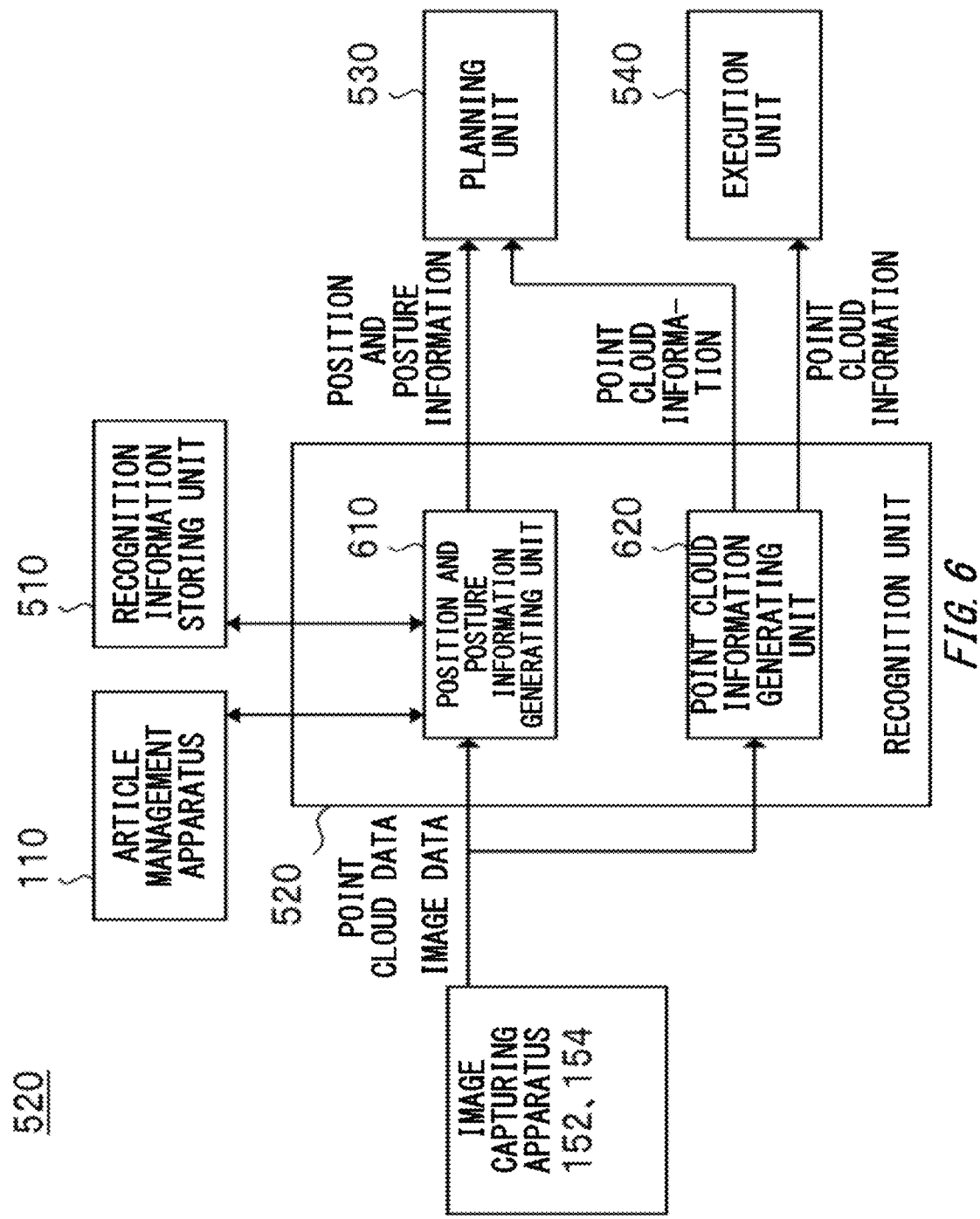
FIG. 6 schematically shows one example of an internal configuration of a recognition unit 520.

FIG. 6 schematically shows one example of an internal configuration of the recognition unit 520. In the present embodiment, the recognition unit 520 includes a position and posture information generating unit 610 and a point cloud information generating unit 620. The position and posture information generating unit 610 may be one example of an image acquiring unit, a point cloud information acquiring unit, a container information acquiring unit and a holding information extracting unit. The point cloud information generating unit 620 may be one example of the image acquiring unit and the point cloud information acquiring unit.

In the present embodiment, the position and posture information generating unit 610 acquires, from the image capturing apparatus 152 and the image capturing apparatus 154, image data of each of the one or more supply pallets 12 and the one or more delivery pallets 14 arranged at the working positions of the transfer apparatus 130. The position and posture information generating unit 610 may also acquire, from the image capturing apparatus 152 and the image capturing apparatus 154, point cloud data of each of the one or more supply pallets 12 and the one or more delivery pallets 14 arranged at the working positions of the transfer apparatus 130. The above-described point cloud data may be three-dimensional point cloud data.

In the present embodiment, the position and posture information generating unit 610 acquires working information from the article management apparatus 110. As described above, the working information includes information indicating the picking sequence of the one or more articles by the transfer apparatus 130, for example. The working information may include identification information of an article that is to be the working target of the transfer apparatus 130. The working information, information indicating an article that is the working target, information indicating a supply pallet 12 that is the move source and information indicating a delivery pallet 14 that is the move destination may also be stored in association with each other. In a case in which the supply pallet 12 stores a single type of article, the identification information of the supply pallet 12 may also be used as the identification information of the article that is the working target of the transfer apparatus 130.

In the present embodiment, the position and posture information generating unit 610 recognizes at least one (which may be referred to as an element) of (i) the supply pallet 12, (ii) at least some of the one or more articles stored in the supply pallet 12, (iii) the delivery pallet 14 and (iv) at least some of the one or more articles stored in the delivery pallet 14. The position and posture information generating unit 610 may also recognize the work 10 that is the working target of the transfer apparatus 130. The position and posture information generating unit 610 recognizes a position and a posture of each recognized element. The position and posture information generating unit 610 generates the position and posture information indicating the information of the position and the posture of each recognized element. The position and posture information generating unit 610 sends the generated position and posture information to the planning unit 530.

The position and posture information generating unit 610 recognizes the position and the posture of each element according to the following procedures, for example. For example, the position and posture information generating unit 610 first analyzes the working information to identify the article being the working target. Next, the position and posture information generating unit 610 accesses to the recognition information storing unit 510 and extracts, by taking the identification information of the article being the working target as a key, from among the information stored in the recognition information storing unit 510, at least one of the two-dimensional information, the three-dimensional information and the feature information of the article associated with the identification information. At this time, the position and posture information generating unit 610 may also extract holding information that is associated with the identification information of the article being the working target.

The recognition information storing unit 510 may not store information of some articles of the articles included in the working information. Here, in a case in which the information regarding the article being the working target is not stored in the recognition information storing unit 510, the position and posture information generating unit 610 accesses to the article information storing unit 250 and extracts, by taking the identification information of the article as the key, from among the information stored in the article information storing unit 250, at least one of the two-dimensional information, the three-dimensional information and the feature information of the article associated with the identification information. At this time, the position and posture information generating unit 610 may also extract holding information associated with the identification information of the article being the working target. When the position and posture information generating unit 610 acquires information from the article information storing unit 250, the position and posture information generating unit 610 may store, in the recognition information storing unit 510, the information and the identification information of the above-described article and store the information in association with each other.

Next, the position and posture information generating unit 610 acquires, from the image capturing apparatus 152 and the image capturing apparatus 154, image data of each of the one or more supply pallets 12 and the one or more delivery pallets 14 arranged at the working positions of the transfer apparatus 130. The recognition unit 520 may also acquire, from the image capturing apparatus 152 and the image capturing apparatus 154, point cloud data of each of the one or more supply pallets 12 and the one or more delivery pallets 14 arranged at the working positions of the transfer apparatus 130. Accordingly, the position and posture information generating unit 610 can acquire the information regarding the state of the surface at least one of the supply pallet 12 and the delivery pallet 14.

Next, the position and posture information generating unit 610 analyzes the image data or the point cloud data of each of the one or more supply pallets 12 by using at least one of the two-dimensional information, the three-dimensional information and the feature information of the article being the working target to recognize (i) the position and the posture of each supply pallet 12 and (ii) the positions and the postures of at least some of the one or more articles stored in each supply pallet 12. Similarly, the position and posture information generating unit 610 recognizes (i) the position and the posture of the delivery pallet 14 and (ii) the positions and the postures of at least some of the one or more articles stored in the delivery pallet 14.

The position and posture information generating unit 610 may also select the work 10 being the working target of the transfer apparatus 130 from among the articles stored in the one or more supply pallets 12. The position and posture information generating unit 610 may select the work 10 being the working target of the transfer apparatus 130 from among the articles whose positions and postures having already been recognized. Note that the process of selecting the work 10 may also be performed in the planning unit 530.

In the present embodiment, the point cloud information generating unit 620 generates the point cloud information of at least one of the supply pallet 12 and the delivery pallet 14. The point cloud information generating unit 620 generates the point cloud information according to the following procedures, for example. In one embodiment, the point cloud information generating unit 620 first acquires, from the image capturing apparatus 152 and the image capturing apparatus 154, point cloud data of each of the one or more supply pallets 12 and the one or more delivery pallets 14 arranged at the working positions of the transfer apparatus 130. Next, the point cloud information generating unit 620 associates the point cloud data of each of the one or more supply pallets 12 and the one or more delivery pallets 14 with the identification information thereof to generate the point cloud information of each of the one or more supply pallets 12 and the one or more delivery pallets 14.

In another embodiment, the point cloud information generating unit 620 first acquires, from the image capturing apparatus 152 and the image capturing apparatus 154, image data of each of the one or more supply pallets 12 and the one or more delivery pallets 14 arranged at the working positions of the transfer apparatus 130. Next, the point cloud information generating unit 620 acquires the point cloud data of each of the one or more supply pallets 12 and the one or more delivery pallets 14 based on the image data of each of the one or more supply pallets 12 and the one or more delivery pallets 14 arranged at the working positions of the transfer apparatus 130. Next, the point cloud information generating unit 620 associates the point cloud data of each of the one or more supply pallets 12 and the one or more delivery pallets 14 with the identification information thereof to generate the point cloud information of each of the one or more supply pallets 12 and the one or more delivery pallets 14.

In the present embodiment, the point cloud information generating unit 620 sends the point cloud information to the planning unit 530. The point cloud information generating unit 620 may also send the point cloud information to the execution unit 540. The point cloud information generating unit 620 may also generate the point cloud information in accordance with an instruction or a request from the execution unit 540 or the concurrent processing control unit 550, and send the point cloud information to the execution unit 540.

Figure 7:
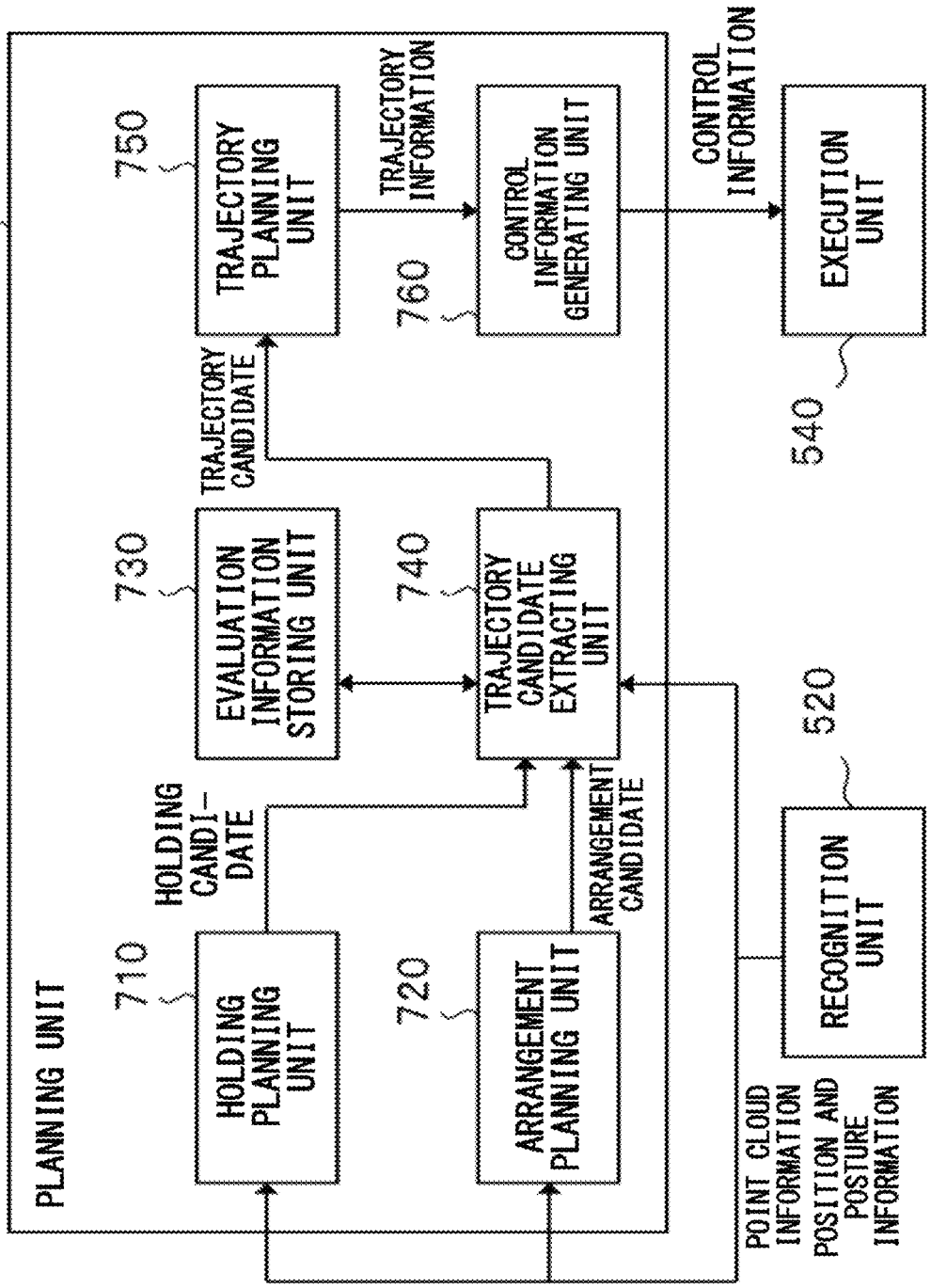
FIG. 7 schematically shows one example of an internal configuration of a planning unit 530.

FIG. 7 schematically shows one example of an internal configuration of the planning unit 530. In the present embodiment, the planning unit 530 includes a holding planning unit 710, an arrangement planning unit 720, an evaluation information storing unit 730, a trajectory candidate extracting unit 740, a trajectory planning unit 750 and a control information generating unit 760.

The holding planning unit 710 may be one example of a first candidate information generating unit. The arrangement planning unit 720 may be one example of a second candidate information generating unit. The trajectory candidate extracting unit 740 may be one example of the first candidate information acquiring unit, the second candidate information acquiring unit and the extracting unit. The trajectory planning unit 750 may be one example of the trajectory information generating unit, the trajectory calculating unit, the determining unit, the trajectory determining unit, and the interpolation trajectory generating unit.

In the present embodiment, the holding planning unit 710 plans a holding method of the work 10 by the picking hand 412. Specifically, the holding planning unit 710 determines the position and the posture of the picking hand 412 when the picking hand 412 holds the work 10 stored in the supply pallet 12. For example, the holding planning unit 710 extracts one or more postures (which may be referred to as holding candidates) that the picking hand 412 can take on a position (which may be referred to as a picking position) on which the picking hand 412 holds the work 10, with reference to (i) the position and posture information of the supply pallet 12, (ii) the position and posture information of the one or more articles stored in the supply pallet 12, (iii) the point cloud information of the supply pallet 12 and (iv) the holding information acquired by the recognition unit 520 from the recognition information storing unit 510 or the article management apparatus 110. The picking position may be one example of a first position.

For example, if the picking hand 412 holds, according to the holding method indicated by the holding information, an article that is of at least some of the one or more articles stored in the supply pallet 12, the holding planning unit 710 determines whether or not the picking hand 412 interferes with the supply pallet 12 and other articles. When the holding planning unit 710 determines that the picking hand 412 does not interfere with the supply pallet 12 and other articles, the holding planning unit 710 extracts the position and the posture of the picking hand 412 at that time as the holding candidate. The holding planning unit 710 repeats the above-described determining processing within a range of a constraint condition regarding the amount or duration time of calculation set by the concurrent processing control unit 550. Accordingly, the holding planning unit 710 can generate the information regarding one or more holding candidates. The holding planning unit 710 sends the information regarding the one or more holding candidates to the trajectory candidate extracting unit 740. The information regarding the one or more holding candidates may be one example of the first candidate information.

In the present embodiment, the arrangement planning unit 720 plans an arrangement method of the work 10 by the picking hand 412. Specifically, the arrangement planning unit 720 determines the position and the posture of the picking hand 412 when the picking hand 412 arranges the work 10 on the delivery pallet 14. For example, the arrangement planning unit 720 extracts one or more postures (which may be referred to as arrangement candidates) that the picking hand 412 can take on a position (which may be referred to as an arrangement position) on which the picking hand 412 arranges the work 10, with reference to (i) the position and posture information of the delivery pallet 14, (ii) the position and posture information of the one or more articles stored in the delivery pallet 14, (iii) the point cloud information of the delivery pallet 14 and (iv) the holding information acquired by the recognition unit 520 from the recognition information storing unit 510 or the article management apparatus 110. The arrangement position may be one example of a second position.

For example, if the picking hand 412 arranges, according to the holding method indicated by the holding information, the work 10 at any position or a specific position of the delivery pallet 14, the arrangement planning unit 720 determines whether or not the picking hand 412 and the work 10 interfere with the delivery pallet 14 and other articles. When the arrangement planning unit 720 determines that the picking hand 412 and the work 10 do not interfere with the delivery pallet 14 and the other articles, the arrangement planning unit 720 extracts the position and the posture of the picking hand 412 at that time as the arrangement candidate. The arrangement planning unit 720 repeats the above-described determining processing within a range of the constraint condition regarding the amount or duration time of calculation set by the concurrent processing control unit 550. Accordingly, the arrangement planning unit 720 can generate the information regarding one or more arrangement candidates. Note that the arrangement planning unit 720 may also repeat the above-described determining processing until all articles included in the user order information are arranged on the delivery pallets 14. The arrangement planning unit 720 sends the information regarding the one or more arrangement candidates to the trajectory candidate extracting unit 740. The information regarding the one or more arrangement candidates may be one example of the second candidate information.

In the present embodiment, the evaluation information storing unit 730 stores information (which may be referred to as evaluation information) regarding a determination reference for extracting a specific trajectory candidate from among one or more trajectory candidates during a process of extracting the trajectory candidates by the trajectory candidate extracting unit 740. As the evaluation information, (i) information for evaluating a period of time during which the picking hand 412 moves from one position to another position, (ii) information for evaluating a period of time during which the picking hand 412 moves from one position to another position with a posture, (iii) information for evaluating a period of time during which the picking hand 412 moves from one position with one posture to another position and (iv) information for evaluating a period of time during which the picking hand 412 moves from one position with one posture to another position with another posture can be illustrated. The period of time of the movement from one position to another position may be evaluated based on an actual measurement value during a trial operation, a previous operation history, empirical laws and the like, for example.

In the present embodiment, the trajectory candidate extracting unit 740 extracts a specific candidate (which may be referred to as a trajectory candidate) from among a plurality of candidates associated with the trajectorys of the picking hand 412. The trajectory candidate is indicated according to an initial arrangement and a final arrangement of the picking hand 412, for example. The trajectory candidate may also be indicated according to the initial arrangement, one or more passing arrangements, and the final arrangement of the picking hand 412. Each of the initial arrangement, the one or more passing arrangements, and the final arrangement of the picking hand 412 may also include information regarding the positions and postures of the picking hand 412. At least one of the initial arrangement, the one or more passing arrangements, and the final arrangement of the picking hand 412 may include information regarding the positions of the picking hand 412 and also, may not include the information regarding the postures of the picking hand 412.

The trajectory candidate extracting unit 740 extracts the trajectory candidates according to the following procedures, for example. The trajectory candidate extracting unit 740 first receives information regarding one or more holding candidates from the holding planning unit 710. Accordingly, for example, the trajectory candidate extracting unit 740 acquires M holding candidates, where M is an integer being 0 or equal to or more than 1. Also, the trajectory candidate extracting unit 740 receives information regarding the one or more arrangement candidates from the arrangement planning unit 720. Accordingly, for example, the trajectory candidate extracting unit 740 acquires N arrangement candidates, where N is an integer being 0 or equal to or more than 1.

At this time, the trajectory candidate extracting unit 740 may also acquire information indicating a position (which may be referred to as a starting position) of the picking hand 412 when the robot 140 starts working on a work or a position and a posture of the picking hand 412 when the robot 140 starts working on the work. The starting position may be one example of a third position. In one embodiment, the starting position of the picking hand 412 may be an immediately preceding arrangement position of the work. Also, the posture of the picking hand 412 on the starting position may be a posture of the picking hand 412 on the immediately preceding arrangement position of the work. In another embodiment, the position and the posture of the picking hand 412 when the robot 140 starts working on the work may also be predetermined.

Next, the trajectory candidate extracting unit 740 extracts one combination from among M×N combinations regarding M holding candidates and N arrangement candidates. The trajectory candidate extracting unit 740 sends the information indicating the extracted combination, as the trajectory candidates, to the trajectory planning unit 750.

The trajectory candidate extracting unit 740 extracts the combination being the trajectory candidate according to the following procedures, for example. First, the trajectory candidate extracting unit 740 calculates, for a combination of one of the M holding candidates and one of the N arrangement candidates, an evaluation function for a period of time during which the picking hand 412 moves from holding position and posture indicated by the selected holding candidate to arrangement position and posture indicated by the selected arrangement candidate. The trajectory candidate extracting unit 740 may calculate the above-described evaluation function with reference to the information stored in the evaluation information storing unit 730. For example, the evaluation function includes an evaluation item regarding an estimated value of a period of time that is from (i) a time when the picking hand 412 picks the work at a holding position with the posture indicated by the selected holding candidate to (ii) a time when the picking hand 412 arranges the work at an arrangement position with the posture indicated by the selected arrangement candidate.

Note that the trajectory candidate extracting unit 740 may also calculate the above-described evaluation function for a trajectory to which the starting position and posture are set as the initial arrangement, the holding position and posture are set as the passing arrangement and the arrangement position and posture are set as the final arrangement. At this time, the evaluation function may include an evaluation item regarding an estimated value of a period of time during which (i) the picking hand 412 moves from the starting position to the holding position, (ii) the picking hand 412 picks a work at the holding position with a posture indicated by the selected holding candidate and (iii) the picking hand 412 arranges the work at the arrangement position with a posture indicated by the selected arrangement candidate.

Next, the trajectory candidate extracting unit 740 repeats the process of calculating the evaluation function for each of the combinations of the holding candidates and the arrangement candidates within a range of the constraint condition regarding the amount or duration time of calculation set by the concurrent processing control unit 550. The trajectory candidate extracting unit 740 selects a combination with the highest evaluation, as the trajectory candidate, among the combinations calculated according to the evaluation function. For example, when the evaluation function is an estimated value of a period of time during which the picking hand 412 moves from the starting position to the arrangement position, if the estimated value of the combination is smaller, the evaluation for the combination is higher. Note that when the calculated evaluation function satisfies the predetermined condition, even if the above-described constraint condition is satisfied, the trajectory candidate extracting unit 740 may also cancel the process of calculating the evaluation function and select a combination of the holding candidate and the arrangement candidate at that time, as the trajectory candidate.

In the present embodiment, the trajectory planning unit 750 generates the trajectory information prescribing the trajectory on which the picking hand 412 picks a work at a holding position and arranges the work at an arrangement position. The trajectory planning unit 750 may also generate trajectory information prescribing a trajectory on which the picking hand 412 moves from the starting position to a holding position, picks a work at the holding position, and arranges the work to an arrangement position. The trajectory planning unit 750 sends the generated trajectory information to the control information generating unit 760.

The trajectory planning unit 750 generates the trajectory information according to the following procedures, for example. The trajectory planning unit 750 first receives information indicating a combination of a holding candidate and an arrangement candidate from the trajectory candidate extracting unit 740. Next, the trajectory planning unit 750 calculates a trajectory on which (i) the picking hand 412 picks, at the holding position, a work with a posture indicated by the holding candidate included in the combination extracted by the trajectory candidate extracting unit 740 and (ii) the picking hand 412 arranges, on the arrangement position, the work with a posture indicated by the arrangement candidate included in the combination extracted by the trajectory candidate extracting unit 740. At this time, the trajectory planning unit 750 may also calculate a trajectory on which (i) the picking hand 412 moves from the starting position to the holding position, (ii) the picking hand 412 picks, at the holding position, a work with a posture indicated by the holding candidate included in the combination extracted by the trajectory candidate extracting unit 740 and (iii) the picking hand 412 arranges, at the arrangement position, the work with a posture indicated by the arrangement candidate included in the combination extracted by the trajectory candidate extracting unit 740.

The trajectory planning unit 750 may calculate the above-described trajectory from the combination of the holding candidate and the arrangement candidate according to a predetermined algorithm. The trajectory planning unit 750 may also calculate the above-described trajectory from the combination of the holding candidate and the arrangement candidate such that the generated trajectory satisfies a predetermined condition.

Next, the trajectory planning unit 750 determines whether the interference is present or absent on the calculated trajectory. For example, the trajectory planning unit 750 determines whether or not another object (for example, an obstacle, another device, another element of the robot 140, and the like) interferes with the picking hand 412 when the picking hand 412 moves along the calculated trajectory. Note that during a step after the picking hand 412 picks the work 10, the trajectory planning unit 750 determines whether or not another object interferes with the picking hand 412 and the work 10.

The trajectory planning unit 750 may also divide the calculated trajectory into a plurality of zones and determine whether the interference is present or absent for each zone. The process of determining the interference for each zone may be performed concurrently or in parallel. When there is even only one zone in which the interference occurs, the trajectory planning unit 750 can determine that the interference occurs on the trajectory even if the determining processing for another zone is not ended. Accordingly, the determination time can be shortened.

The trajectory planning unit 750 determines the trajectory of the picking hand 412 based on the above-described determination result. For example, the trajectory planning unit 750 generates an interpolation trajectory of the trajectory if the trajectory planning unit 750 determines that no interference occurs on the calculated trajectory. Accordingly, an excessive acceleration can be prevented from being applied to the work 10. Also, the trajectory planning unit 750 generates the trajectory information prescribing the above-described interpolation trajectory. The trajectory information may be information indicating an angle of each joint of the robot arm 414 at each time.

On the other hand, when the trajectory planning unit 750 determines that the interference occurs on the calculated trajectory, the trajectory planning unit 750 accesses to the trajectory candidate extracting unit 740 to request for information indicating a combination having an evaluation that is next highest after the previous combination. As the trajectory planning unit 750 receives the information indicating a new combination from the trajectory candidate extracting unit 740, the trajectory planning unit 750 generates the trajectory information according to procedures similar to the above-described procedures. The combination having the next highest evaluation may be one example of another combination.

In a case in which the amount or duration time of calculation in the trajectory planning unit 750 satisfies the predetermined condition, the trajectory planning unit 750 suspends the process regarding the current combination. For example, the trajectory planning unit 750 determines the amount or duration time of calculation allocated to the above-described determining processing so as to generate the trajectory information within a range of the constraint condition regarding the amount or duration time of calculation set by the concurrent processing control unit 550. If the determining processing is not ended even when the determined amount or duration time of calculation is exceeded, the trajectory planning unit 750 suspends the determining processing regarding the current combination. After that, the trajectory planning unit 750 accesses to the trajectory candidate extracting unit 740 to request for information indicating a combination having an evaluation that is next highest after the current combination. As the trajectory planning unit 750 receives the information indicating a new combination from the trajectory candidate extracting unit 740, the trajectory planning unit 750 generates the trajectory information according to procedures similar to the above-described procedures.

In the present embodiment, the control information generating unit 760 generates the control information for controlling the picking hand 412 and the robot arm 414. For example, the control information generating unit 760 receives the trajectory information from the trajectory planning unit 750. For example, the control information generating unit 760 adds, to the trajectory information generated by the trajectory planning unit 750, the another information that is necessary for controlling the picking hand 412 and the robot arm 414 to generate the control information. The control information generating unit 760 may also convert the trajectory information generated by the trajectory planning unit 750 into a format in accordance with the type of the robot 140 to generate the control information. The control information generating unit 760 sends the control information to the execution unit 540.

Figure 8:
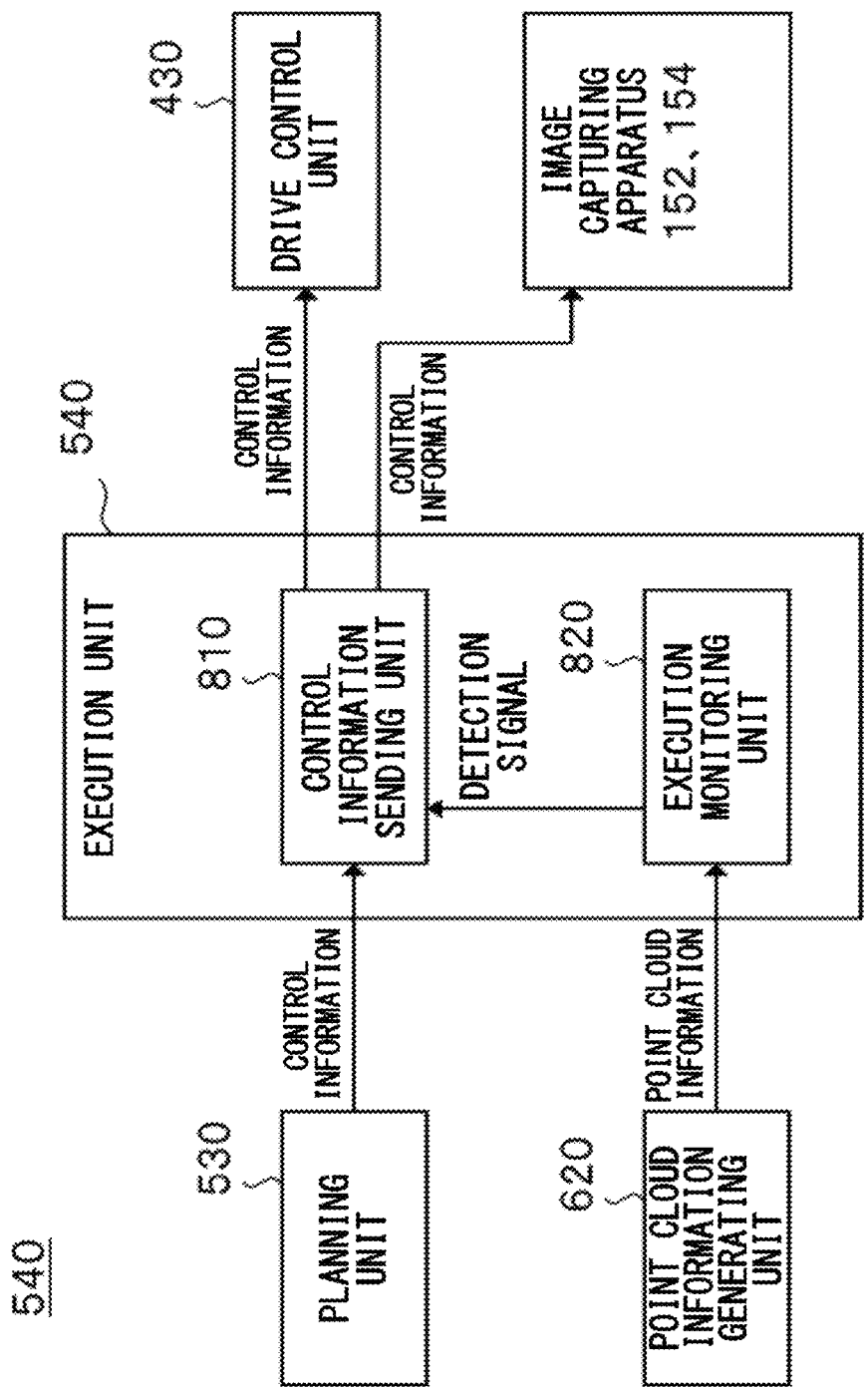
FIG. 8 schematically shows another example of an internal configuration of an execution unit 540.

FIG. 8 schematically shows another example of the internal configuration of the execution unit 540. In the present embodiment, the execution unit 540 includes a control information sending unit 810 and an execution monitoring unit 820. The control information sending unit 810 may be one example of the instruction sending unit. The execution monitoring unit 820 may be one example of the control device, the point cloud information acquiring unit, the abnormality detection unit and the instruction sending unit.

In the present embodiment, the control information sending unit 810 sends various control information to each unit of the distribution management system 100 to control at least some of the distribution management system 100. The control information sending unit 810 may also control the transfer apparatus 130 or the transfer control apparatus 160. For example, the control information sending unit 810 sends the control information for controlling the robot 140 to the drive control unit 430 to control the operation of the robot 140. If the control information sending unit 810 receives, from the execution monitoring unit 820, a detection signal indicating that an abnormality is detected, the control information sending unit 810 may also send an instruction for suspending the operation of the robot 140 to the robot 140.

The control information sending unit 810 may also control the image capturing apparatus 152 and the image capturing apparatus 154. For example, the control information sending unit 810 may control a position, an angle, magnification and the like of an image capturing apparatus for each image capturing apparatus.

The control information sending unit 810 may also control at least one of the recognition unit 520 and the planning unit 530. For example, if an abnormality occurs on the robot 140, the control information sending unit 810 suspends the current process and sends an instruction for starting new recognition processing and planning processing to the recognition unit 520 and the planning unit 530. The control information sending unit 810 requests, at a specific time, the point cloud information generating unit 620 to send point cloud information of at least one of the supply pallet 12 and the delivery pallet 14. The supply pallet 12 and the delivery pallet 14 may be one example of a region including at least one of the picking hand 412 and the work 10.

As the above-described specific time, at least one of the followings can be illustrated: (i) a time at which the picking hand 412 picks the work 10 at the holding position, (ii) a time at which the picking hand 412 moves the work 10 out of the supply pallet 12, (iii) a time at which the picking hand 412 moves the work 10 in the delivery pallet 14, (iv) a time at which the picking hand 412 arranges the work 10 at the arrangement position. Accordingly, an abnormality such as an interference and load collapse can be detected in an early stage.

In the present embodiment, the execution monitoring unit 820 monitors the operation of the robot 140, the supply pallet 12 and the delivery pallet 14. For example, the execution monitoring unit 820 receives, from the point cloud information generating unit 620, the point cloud information of at least one of the supply pallet 12 and the delivery pallet 14 at the above-described specific time. The execution monitoring unit 820 detects the abnormality based on the above-described point cloud information. The execution monitoring unit 820 may also detect the abnormality based on (i) the above-described point cloud information and (ii) at least one selected from a group including: a measurement value for a sensor arranged on the robot 140; a control value for at least one of the picking hand 412 and the robot arm 414; and at least one of torque, a voltage value and a current value for the driving unit 420.

If the abnormality is detected, the execution monitoring unit 820 sends a detection signal indicating that the abnormality is detected to the control information sending unit 810, for example. If the abnormality is detected, the execution monitoring unit 820 may also send an instruction for suspending the operation of the robot 140 to the robot 140.

Figure 9:
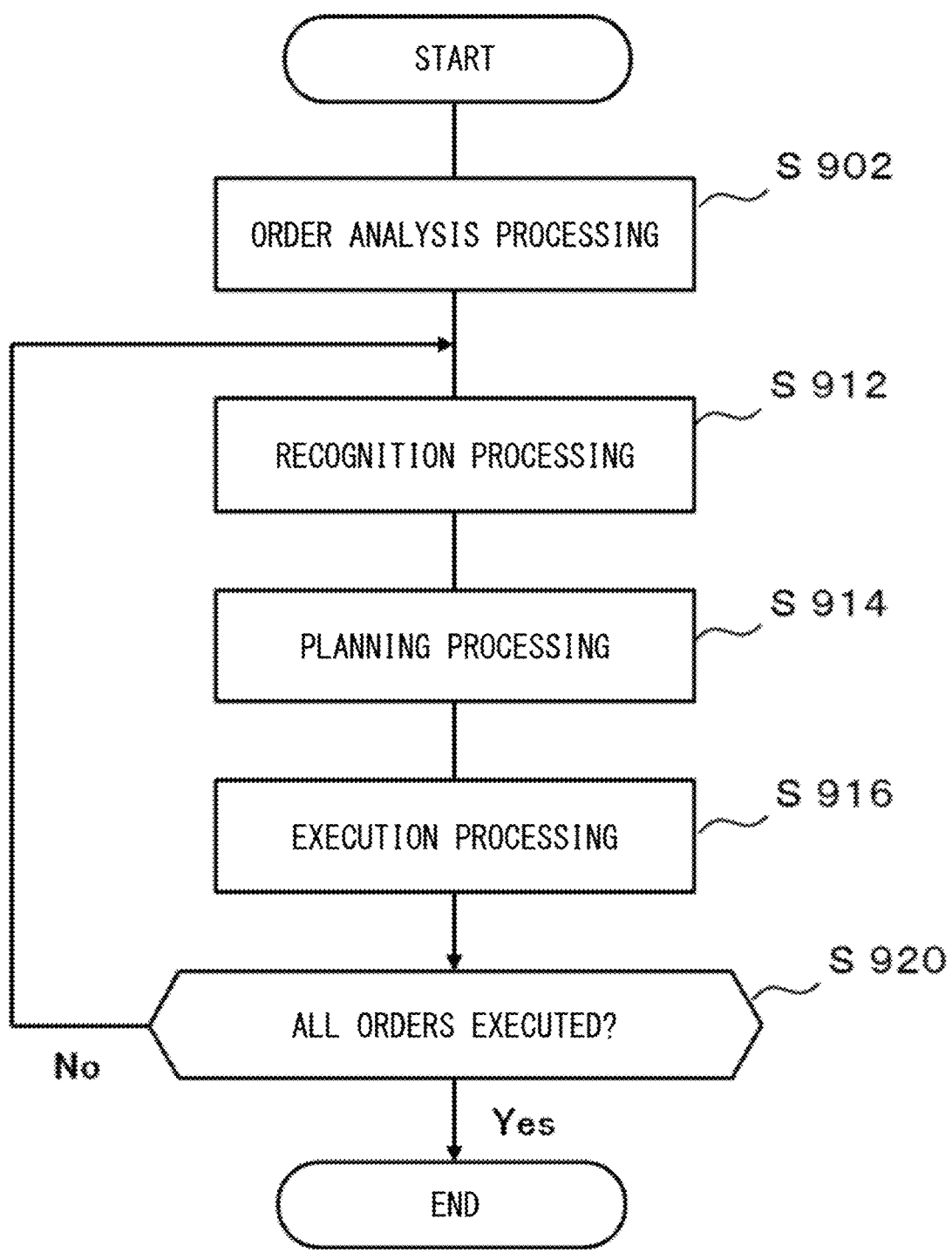
FIG. 9 schematically shows one example of information processing in a transfer control apparatus 160.

FIG. 9 schematically shows one example of information processing in the transfer control apparatus 160. According to the present embodiment, first, in a step 902 (the term "step" may be abbreviated as the letter "S"), the recognition unit 520 receives user order information or working information from the article management apparatus 110. The recognition unit 520 analyzes the user order information or the working information. For example, the recognition unit 520 determines the picking sequence of one or more articles to the transfer apparatus 130 based on the user order information or the working information. The recognition unit 520 may generate information in which the identification information of the one or more articles are arranged in the picking sequence to the transfer apparatus 130.

In S912, the recognition unit 520 performs recognition processing. In S914, the planning unit 530 performs planning processing. In S916, the execution unit 540 performs execution processing. Also, the execution unit 540 monitors the operation of the robot 140 and the supply pallet 12 and the delivery pallet 14 during a period in which the robot 140 transfers the work 10. When occurrence of the abnormality is detected, the execution unit 540 suspends the processing in S916 and starts the processing from S912 again.

Next, in S920, the execution unit 540 determines whether or not the transfer processing of all articles included in the user order information or working information is ended, for example. If the execution unit 540 determines that the transfer processing of all articles is ended (in a case of "Yes" in S920), the execution unit 540 ends the processing. On the other hand, if the execution unit 540 determines that the transfer processing of all articles is not ended (in a case of "No" in S920), the execution unit 540 performs, on a next article, processing from S912 to S920.

Figure 10:
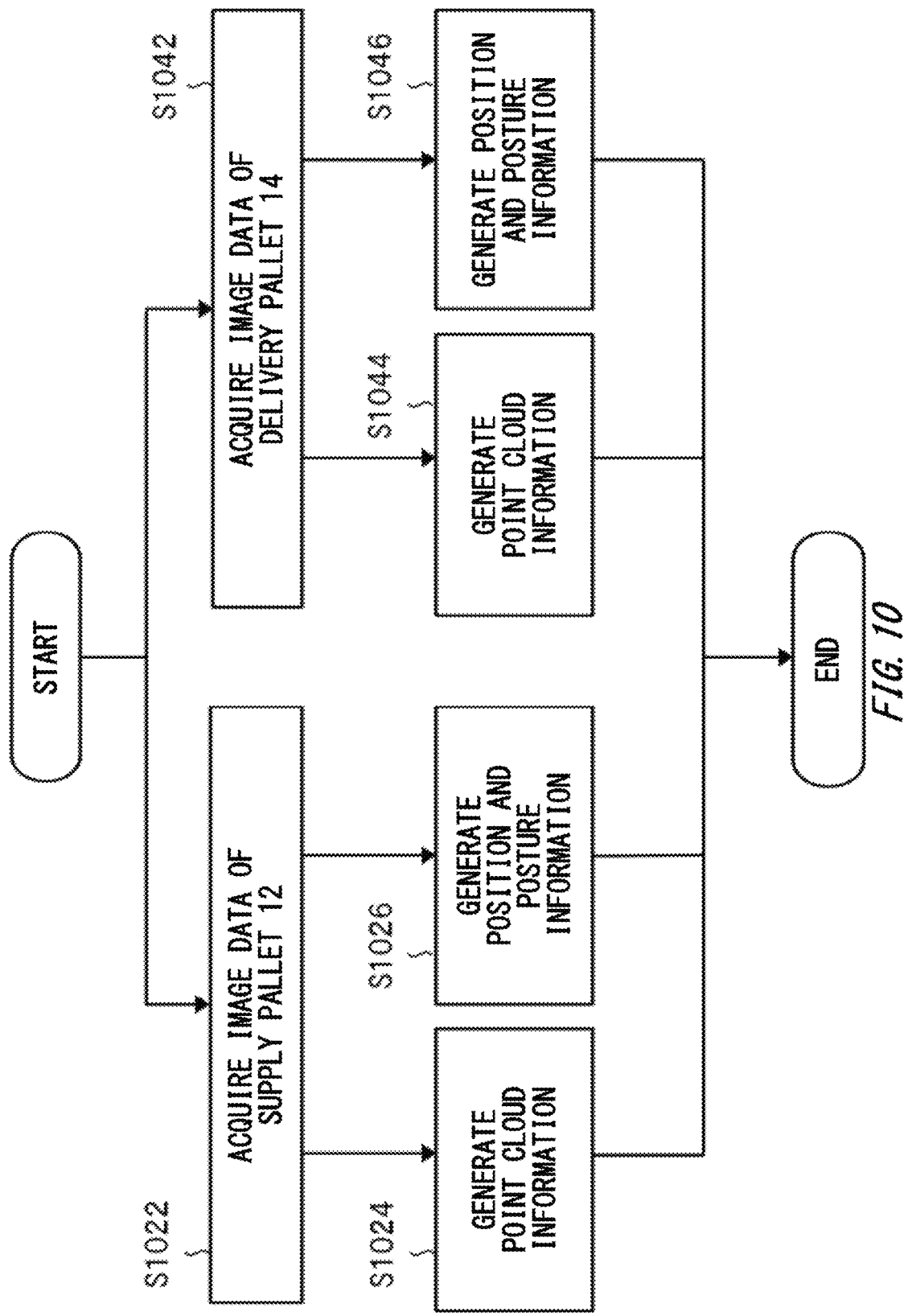
FIG. 10 schematically shows one example of the recognition processing in S912.

FIG. 10 schematically shows one example of the recognition processing in S912. In the present embodiment, (i) the process of generating the point cloud information and the position and posture information regarding the supply pallet 12 and (ii) the process of generating the point cloud information and the position and posture information regarding the delivery pallet 14 are performed concurrently or in parallel. In the present embodiment, the process of generating the point cloud information and the process of generating the position and posture information are performed concurrently or in parallel.

According to the present embodiment, in S1022, the position and posture information generating unit 610 acquires the image data of the supply pallet 12 from the image capturing apparatus 152. Also, the point cloud information generating unit 620 acquires the point cloud data of the supply pallet 12 from the image capturing apparatus 152. The point cloud information generating unit 620 may also generate the point cloud data of the supply pallet 12 based on the image data of the supply pallet 12.

Next, in S1024, the point cloud information generating unit 620 generates the point cloud information of the supply pallet 12. Also, in S1026, the position and posture information generating unit 610 generates the position and posture information of the supply pallet 12 and the article stored in the supply pallet 12. In the present embodiment, S1024 and S1026 are performed concurrently or in parallel. Note that during a period in which S1026 is performed for one time, S1024 may be performed for multiple times.

On the other hand, in S1042, the position and posture information generating unit 610 acquires the image data of the delivery pallet 14 from the image capturing apparatus 154. Also, the point cloud information generating unit 620 acquires the point cloud data of the delivery pallet 14 from the image capturing apparatus 154. The point cloud information generating unit 620 may also generate the point cloud data of the delivery pallet 14 based on the image data of the delivery pallet 14. In the present embodiment, S1022 and S1042 are performed concurrently or in parallel.

Next, in S1044, the point cloud information generating unit 620 generates the point cloud information of the delivery pallet 14. Also, in S1046, the position and posture information generating unit 610 generates the position and posture information of the delivery pallet 14 and the article stored in the delivery pallet 14. In the present embodiment, S1044 and S1046 are performed concurrently or in parallel. Note that during a period in which S1046 is performed for one time, S1044 may also be performed for multiple times.

Figure 11:
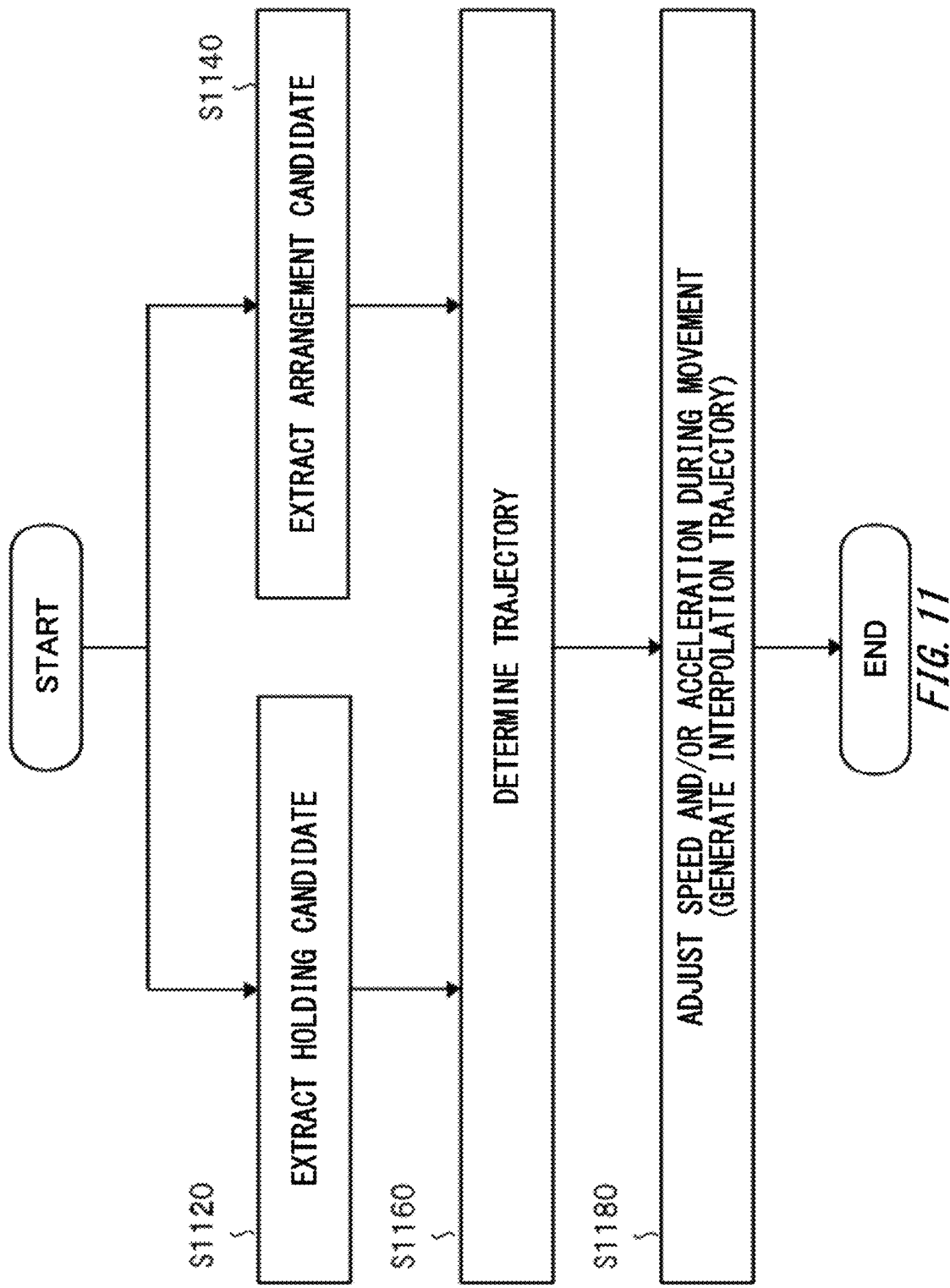
FIG. 11 schematically shows one example of planning processing n S914.

FIG. 11 schematically shows one example of the planning processing in S914. In the present embodiment, the process of extracting the holding candidate in the holding planning unit 710 and the process of extracting the arrangement candidate in the arrangement planning unit 720 are performed concurrently or in parallel. According to the present embodiment, in S1120, the holding planning unit 710 extracts the holding candidate. Also, in S1140, the arrangement planning unit 720 extracts the arrangement candidate.

In the present embodiment, S1120 and S1140 are performed concurrently or in parallel. After that, in S1160, the trajectory candidate extracting unit 740 extracts the trajectory candidate and the trajectory planning unit 750 determines the trajectory. Also, in S1180, an interpolation trajectory of the determined trajectory is generated.

Figure 12:
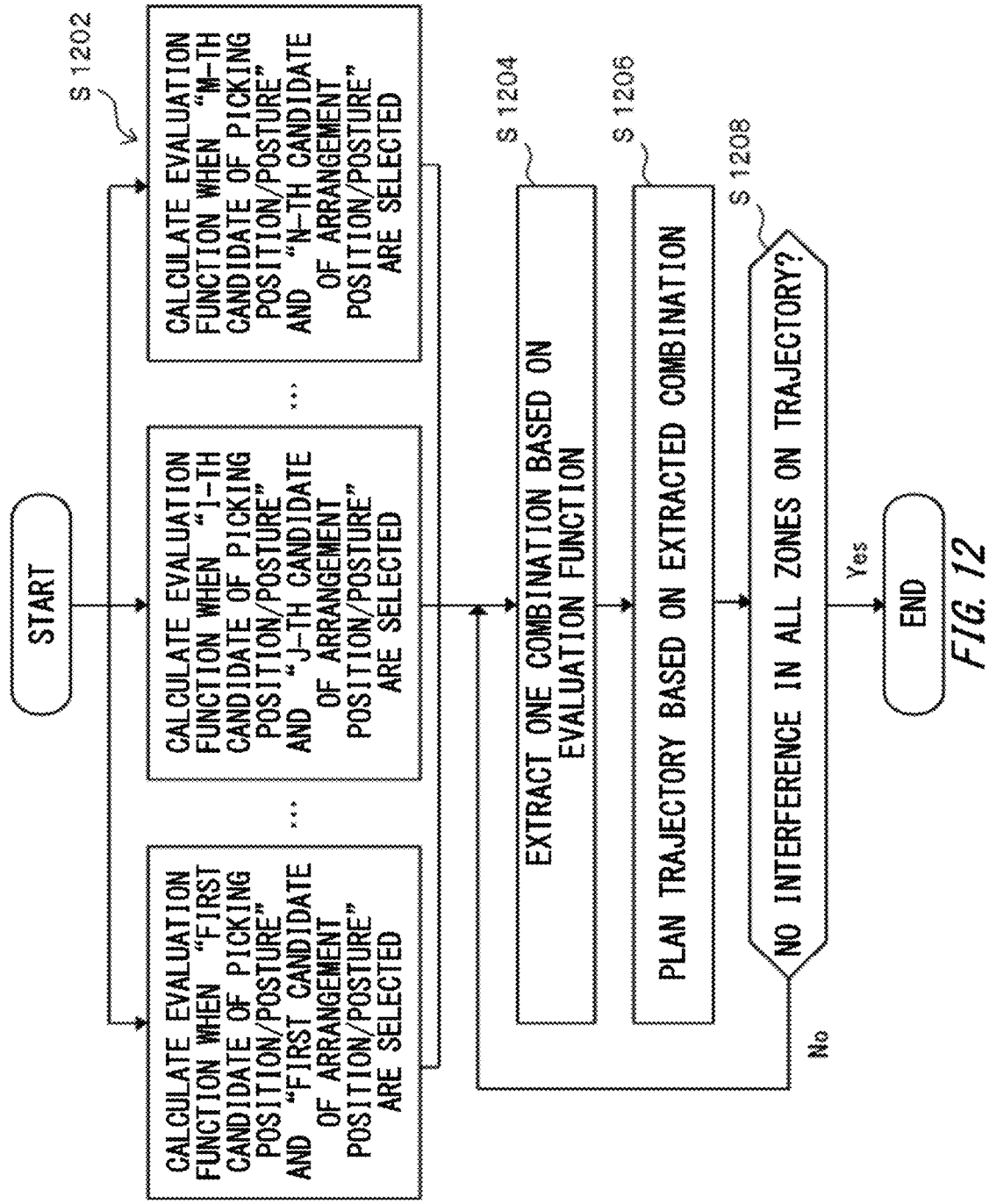
FIG. 12 schematically shows one example of trajectory planning processing in S1160.

FIG. 12 schematically shows one example of the trajectory planning processing in S1160. In the present embodiment, the processes in which the trajectory candidate extracting unit 740 calculates the evaluation functions for at least some of M×N combinations regarding M holding candidates and N arrangement candidates are performed concurrently or in parallel. According to the present embodiment, in S1202, the trajectory candidate extracting unit 740 calculates the evaluation function for each of the M×N combinations regarding the M holding candidates and the N arrangement candidates. At this time, the trajectory candidate extracting unit 740 performs the process of calculating the evaluation function for each of the M×N combinations concurrently or in parallel. After that, in S1204, the trajectory candidate extracting unit 740 extracts one combination from among the M×N combinations based on the evaluation function of each combination.

Next, in S1206, the trajectory planning unit 750 calculates a trajectory on which (i) the picking hand 412 picks, at a holding position, a work with a posture indicated by the holding candidate included in the combination extracted by the trajectory candidate extracting unit 740 and (ii) the picking hand 412 arranges, at an arrangement position, the work with a posture indicated by the arrangement candidate included in the combination extracted by the trajectory candidate extracting unit 740.

In S1208, the trajectory planning unit 750 determines whether the interference is present or absent on the calculated trajectory. In the present embodiment, the trajectory planning unit 750 divides the calculated trajectory into a plurality of zones to determine whether the interference is present or absent for each zone. If it is determined that no interference occurs on the trajectory in all zones (in a case of "Yes" in S1208), the trajectory planning unit 750 ends the processing. Note that even in this case, the processing from S1204 to S1208 may also be repeated within a range of the constraint condition regarding the amount or duration time of calculation set by the concurrent processing control unit 550. On the other hand, if it is determined that an interference occurs on the trajectory in at least some zones (in a case of "No" in S1208), the processing from S1204 to S1208 is repeated.

Figure 13:
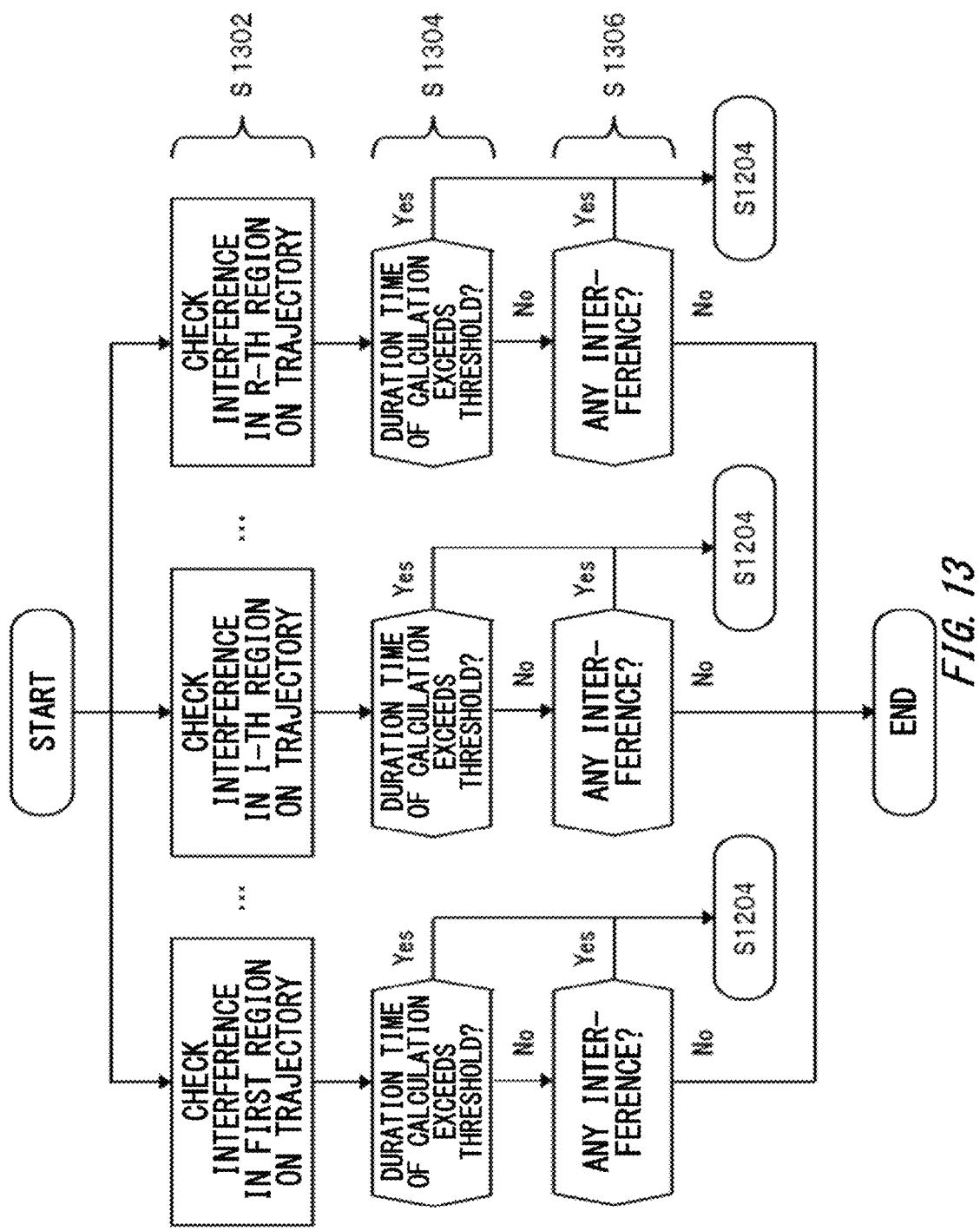
FIG. 13 schematically shows one example of interference checking processing in S1208.

FIG. 13 schematically shows one example of the interference checking processing in S1208. In the present embodiment, the trajectory planning unit 750 divides the trajectory calculated in S1206 into a plurality of zones to determine whether an interference is present or absent for each zone. Also, the trajectory planning unit 750 performs the determining processing in at least two zones concurrently or in parallel. According to the present embodiment, in S1302, the trajectory planning unit 750 determines whether the interference is present or absent on the trajectory calculated in S1206. The trajectory planning unit 750 divides the trajectory calculated in S1206 into a plurality of zones to determine whether the interference is present or absent for each zone. The trajectory planning unit 750 performs the determining processing in all zones concurrently or in parallel, for example.

In the determining processing for each zone, if the duration time or amount of calculation exceeds a predetermined threshold before the determining processing is ended (in a case of "Yes" in S1304), the trajectory planning unit 750 cancels the determining processing in all zones and returns to the processing in S1204. On the other hand, if the determining processing is ended before the duration time or amount of calculation exceeds the predetermined threshold and when it is determined that an interference occurs in one zone (in a case of "Yes" in S1306), the trajectory planning unit 750 cancels the determining processing in all zones and returns to the processing in S1204. On the other hand, if the determining processing is ended before the duration time or amount of calculation exceeds the predetermined threshold and when it is determined that an interference does not occur in the zone (in a case of "No" in S1306), the determining processing in the zone is ended.

Figure 15:
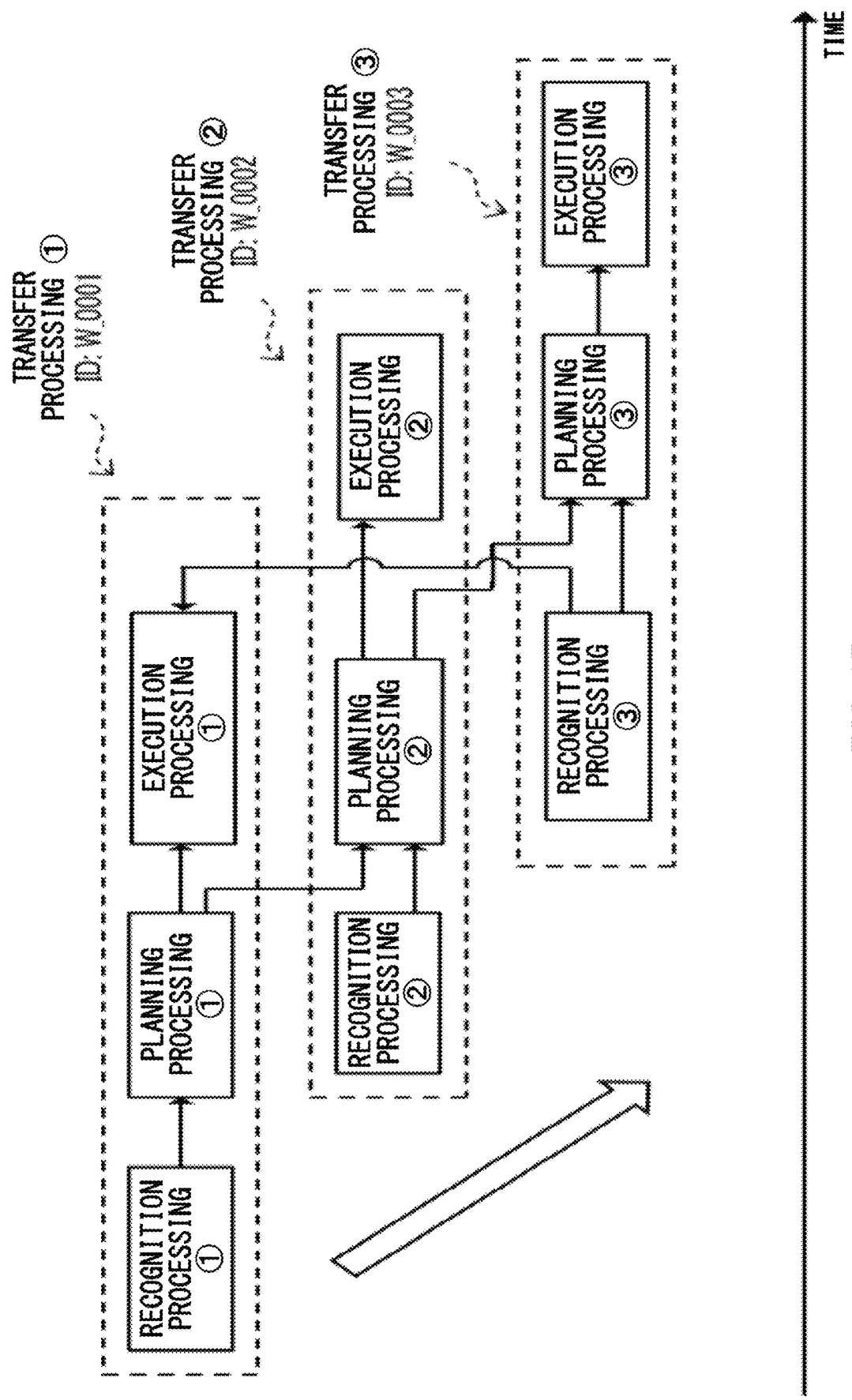
FIG. 15 schematically shows one example of concurrent processing between works.
Figure 16:
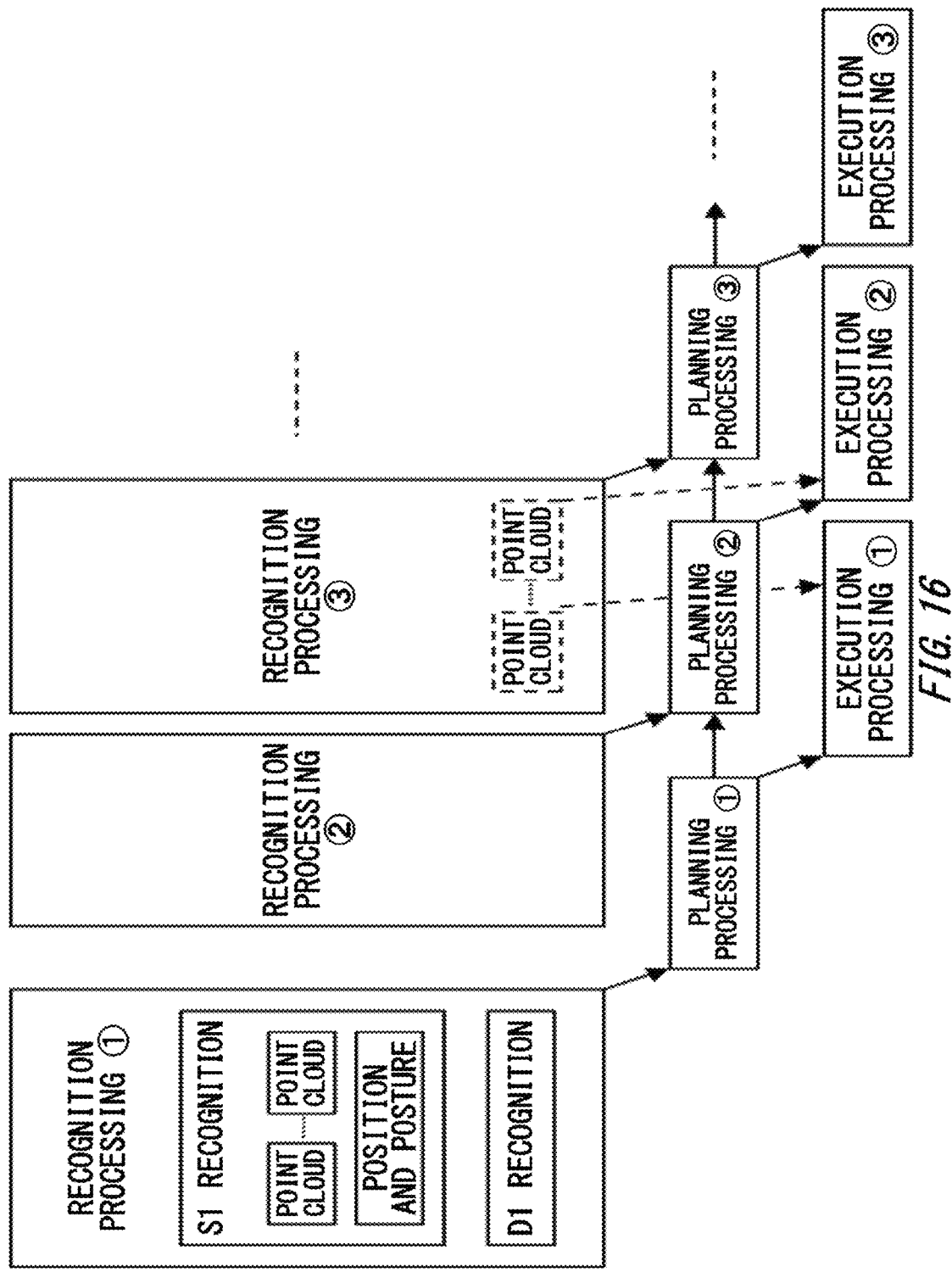
FIG. 16 schematically shows one example of concurrent processing between works.

Concurrent processing between works or between orders in the transfer control apparatus 160 is described by using FIG. 14, FIG. 15 and FIG. 16. FIG. 14 schematically shows one example of the data table 1400. FIG. 15 schematically shows one example of the concurrent processing between works. FIG. 16 schematically shows one example of the concurrent processing between works.

As shown in FIG. 14, in the present embodiment, the data table 1400 stores a work ID 1410, an order ID 1420 and contents 1430 of an order in association with each other. The contents 1430 of the order include an article ID 1432 for identifying an article to be a transfer target, a supply pallet ID 1434 for identifying a supply pallet, and a delivery pallet ID 1436 for identifying a delivery pallet, for example.

As shown in FIG. 15, according to the present embodiment, the planning unit 530 performs, after performing planning processing of a work having the work ID 1410 being W_0001 and before completing execution processing of the work having the work ID 1410 being W_0001, planning processing of the work having the work ID 1410 being W_0002 and recognition processing of the work having the work ID 1410 being W_0003. Accordingly, during the period in which the execution processing of the work having the work ID 1410 being W_0001 is performed, the planning processing of the work having the work ID 1410 being W_0002 is performed and the recognition processing of the work having the work ID 1410 being W_0003 is performed.

The amount or duration time of calculation of the planning processing of the work having the work ID 1410 being W_0002 is adjusted such that the planning processing is ended before the execution processing of the work having the work ID 1410 being W_0001 is completed, for example. More specifically, the concurrent processing control unit 550 adjusts the amount or duration time of calculation of the planning unit 530 according to the following procedures.

For example, the concurrent processing control unit 550 estimates a period of time that is from the time when the robot 140 receives the control information regarding a work having the work ID 1410 being W_0001 to the time when the operation of the robot 140 on the work is ended. The concurrent processing control unit 550 may also estimate the above-described period of time based on the trajectory information of the work having the work ID 1410 being W_0001. The above-described period of time may be one example of the constraint condition. The concurrent processing control unit 550 sends the above-described estimation result to the planning unit 530.

On the other hand, the planning unit 530 adjusts the amount of calculation of the work planning processing such that the planning processing of the work having the work ID 1410 being W_0002 is completed before the period of time estimated by the concurrent processing control unit 550 is expired or elapsed. For example, the amount of calculation of the planning processing is adjusted by adjusting a value of the threshold in S1304.

As shown in FIG. 16, in the recognition processing of the work having the work ID 1410 being W_0001, the recognition processing of the supply pallet 12 having a supply pallet ID 1434 being S_0001 and the recognition processing of the delivery pallet 14 having a delivery pallet ID 1436 being D_0001 are performed concurrently or in parallel. Also, in the recognition processing of each supply pallet 12, the process of generating the point cloud information and the process of generating the position and posture information are performed concurrently or in parallel. Similarly, in the recognition processing of each delivery pallet 14, the process of generating the point cloud information and the process of generating the position and posture information are performed concurrently or in parallel.

In the present embodiment, the process of generating the point cloud information is performed for multiple times during the period in which the recognition processing is performed for one time. Accordingly, the recognition unit 520 can provide the point cloud information to another element (for example, the execution unit 540) at a proper time. Also, waiting time in another element until the point cloud information is provided is reduced.

While the embodiments of the present invention have been described, the technical scope of the invention is not limited to the above described embodiments. It is apparent to persons skilled in the art that various alterations and improvements can be added to the above-described embodiments. Also, the matters described with reference to a specific embodiment can be applied to another embodiment as long as such application does not cause a technical contradiction. Also, each component may also have a similar feature to another component that has the same name but has a different reference sign. It is also apparent from the scope of the claims that the embodiments added with such alterations or improvements can be included in the technical scope of the invention.

The operations, procedures, steps, and stages of each process performed by an apparatus, system, program, and method shown in the claims, embodiments, or diagrams can be performed in any order as long as the order is not indicated by "prior to," "before," or the like and as long as the output from a previous process is not used in a later process. Even if the process flow is described using phrases such as "first" or "next" in the claims, embodiments, or diagrams, it does not necessarily mean that the process must be performed in this order.

For example, in the specification of the present application, the following matters are described.

[Item 1-1]

A control device for controlling a picking apparatus that arranges, at a second position, a work that is picked at a first position by using a picking hand, the second position being different from the above-described first position, the control device including:

a first candidate information acquiring unit for acquiring first candidate information indicating each of one or more postures that the above-described picking hand takes on the above-described first position;

a second candidate information acquiring unit for acquiring second candidate information indicating each of one or more postures that the above-described picking hand takes on the above-described second position;

an extracting unit for extracting one combination from among one or more combinations regarding one or more postures indicated by the above-described first candidate information and one or more postures indicated by the above-described second candidate information;

a trajectory calculating unit for calculating a trajectory on which (i) the above-described picking hand picks, at the above-described first position, the above-described work with a posture associated with the above-described first position included in the above-described one combination and (ii) the above-described picking hand arranges, at the above-described second position, the above-described work with a posture associated with the above-described second position included in the above-described one combination; and a determining unit for determining whether an interference is present or absent on the trajectory calculated by the above-described trajectory calculating unit.

[Item 1-2]

The control device according to Item 1-1, wherein when the above-described determining unit determines that the interference occurs on the above-described trajectory, the above-described extracting unit extracts another combination from among the above-described one or more combinations, the above-described trajectory calculating unit calculates a trajectory on which (i) the above-described picking hand picks, at the above-described first position, the above-described work with a posture associated with the above-described first position included in the above-described other combination and (ii) the above-described picking hand arranges, at the above-described second position, the above-described work with a posture associated with the above-described second position included in the above-described other combination, and the above-described determining unit determines whether the interference is present or absent on the trajectory being calculated by the above-described trajectory calculating unit and being associated with the above-described other combination.

[Item 1-3]

The control device according to Item 1-1, wherein when an amount or duration time of calculation in at least one of the above-described extracting unit, the above-described trajectory calculating unit and the above-described determining unit satisfies a predetermined condition, the above-described extracting unit extracts another combination from among the above-described one or more combinations, the above-described trajectory calculating unit calculates a trajectory on which (i) the above-described picking hand picks, at the above-described first position, the above-described work with a posture associated with the above-described first position included in the above-described other combination and (ii) the above-described picking hand arranges, at the above-described second position, the above-described work with a posture associated with the above-described second position included in the above-described other combination, and the above-described determining unit determines whether the interference is present or absent on the trajectory being calculated by the above-described trajectory calculating unit and being associated with the above-described other combination.

[Item 1-4]

The control device according to any one of Items 1-1 to 1-3, wherein the above-described trajectory calculating unit calculates a trajectory on which (i) the above-described picking hand moves from a third position that is a position of the above-described picking hand when the above-described picking apparatus starts working on the above-described work to the above-described first position, (ii) the above-described picking hand picks, at the above-described first position, the above-described work with a posture associated with the above-described first position included in the combination extracted by the above-described extracting unit and (iii) the above-described picking hand arranges, at the above-described second position, the above-described work with a posture associated with the above-described second position included in the combination extracted by the above-described extracting unit.

[Item 1-5]

The control device according to any one of Items 1-1 to 1-4, wherein the above-described extracting unit calculates an evaluation function for at least some of the above-described one or more combinations, and selects the above-described one combination based on the above-described evaluation function.

[Item 1-6]

The control device according to Item 1-5, wherein the above-described evaluation function includes an evaluation item regarding an estimated value of a period of time that is from (i) a time when the above-described picking hand picks, at the above-described first position, the above-described work with the posture associated with the above-described first position included in a combination that is to be an evaluation target by the above-described evaluation function to (ii) a time when the above-described picking hand arranges, at the above-described second position, the above-described work with the posture associated with the above-described second position included in the combination that is to be the evaluation target by the above-described evaluation function.

[Item 1-7]

The control device according to Item 1-5, wherein the above-described evaluation function includes an evaluation item regarding an estimated value of a period of time that is from (i) a time when the above-described picking hand moves from a third position that is a position of the above-described picking hand when the above-described picking apparatus starts working on the above-described work to the above-described first position, (ii) the above-described picking hand picks, at the above-described first position, the above-described work with a posture associated with the above-described first position included in the combination that is to be an evaluation target by the above-described evaluation function, to (iii) a time when the above-described picking hand arranges, at the above-described second position, the above-described work with a posture associated with the above-described second position included in the combination that is to be the evaluation target by the above-described evaluation function.

[Item 1-8]

The control device according to any one of Items 1-1 to 1-7, wherein the above-described determining unit divides the trajectory calculated by the above-described trajectory calculating unit into a plurality of zones, determines whether an interference is present or absent for each zone.

[Item 1-9]

The control device according to any one of Items 1-1 to 1-8, further including a trajectory determining unit for determining a trajectory of the above-described picking hand based on a determination result of the above-described determining unit.

[Item 1-10]

The control device according to Item 1-9, wherein the above-described trajectory determining unit has an interpolation trajectory generating unit for generating an interpolation trajectory of the trajectory calculated by the above-described trajectory calculating unit.

[Item 1-11]

A picking system including the control device according to any one of Items 1-1 to 1-10; and the above-described picking apparatus.

[Item 1-12]

A distribution system including the control device according to any one of Items 1-1 to 1-10;

the above-described picking apparatus; and a conveying apparatus to convey the above-described work.

[Item 1-13]

A program to cause a computer to serve as the control device according to any one of Items 1-1 to 1-10.

[Item 1-14]

A control method for controlling a picking apparatus that arranges, at a second position, a work picked at a first position by using a picking hand, the second position being different from the above-described first position, the control method including:

a first candidate information acquiring step of acquiring first candidate information indicating each of one or more postures that the above-described picking hand takes on the above-described first position;

a second candidate information acquiring step of acquiring second candidate information indicating each of one or more postures that the above-described picking hand takes on the above-described second position;

an extracting step of extracting one combination from among one or more combinations regarding one or more postures indicated by the above-described first candidate information and one or more postures indicated by the above-described second candidate information;

a trajectory calculating step of calculating a trajectory on which (i) the above-described picking hand picks, at the above-described first position, the above-described work with a posture associated with the above-described first position included in the above-described one combination and (ii) the above-described picking hand arranges, at the above-described second position, the above-described work with a posture associated with the above-described second position included in the above-described one combination; and a determining step of determining whether an interference is present or absent on the trajectory calculated in the above-described trajectory calculating step.

[Item 1-15]

A method of producing a container in which a work is arranged by using a picking apparatus which arranges, at a second position, the above-described work picked at a first position by using a picking hand, the second position being different from the above-described first position, the method of producing the container including:

a step of setting a specific position of the above-described container to the above-described second position;

a first candidate information acquiring step of acquiring first candidate information indicating each of one or more postures that picking hand takes on the above-described first position;

a second candidate information acquiring step of acquiring second candidate information indicating each of one or more postures that the above-described picking hand takes on the above-described second position;

an extracting step of extracting one combination from among one or more combinations regarding one or more postures indicated by the above-described first candidate information and one or more postures indicated by the above-described second candidate information;

a trajectory calculating step of calculating a trajectory on which (i) the above-described picking hand picks, at the above-described first position, the above-described work with a posture associated with the above-described first position included in the above-described one combination and (ii) the above-described picking hand arranges, at the above-described second position, the above-described work with a posture associated with the above-described second position included in the above-described one combination; and a determining step of determining whether an interference is present or absent on the trajectory calculated in the above-described calculating the trajectory.

[Item 2-1]

A control device for controlling a picking apparatus that arranges, at a second position of a second container, a work picked at a first position of a first container by using a picking hand, the second container being different from the above-described first container, the control device including:

a trajectory information generating unit for generating trajectory information prescribing a trajectory on which the above-described picking hand picks the above-described work at the above-described first position and arranges the work at the above-described second position;

an execution control unit for operating the above-described picking apparatus based on the trajectory information generated by the above-described trajectory information generating unit; and an execution time estimating unit for estimating a period of time that is from the time when the above-described picking apparatus receives an instruction for starting an operation on the above-described work to the time when the operation of the above-described picking apparatus on the above-described work is ended, wherein the above-described trajectory information generating unit adjusts an amount of calculation based on an estimation result of the above-described execution time estimating unit.

[Item 2-2]

The control device according to Item 2-1, wherein after the above-described trajectory information generating unit performs process of generating trajectory information regarding a first work and before a movement of the above-described first work is completed, the above-described trajectory information generating unit performs the process of generating trajectory information regarding a second work being different from the above-described first work, the above-described execution time estimating unit estimates, based on the trajectory information being generated by the above-described trajectory information generating unit and regarding the above-described first work, a first period of time that is from the time when the above-described picking apparatus receives an instruction for starting an operation on the above-described first work to the time when an operation of the above-described picking apparatus on the above-described first work is ended, and before the above-described first period of time estimated by the above-described execution time estimating unit is expired or elapsed, the above-described trajectory information generating unit adjusts an amount of calculation of a process of generating trajectory information regarding the above-described second work such that a process of generating trajectory information regarding the above-described second work is completed.

[Item 2-3]

The control device according to Item 2-2, wherein the above-described trajectory information generating unit generates the trajectory information regarding the above-described second work by using an operation result in the process of generating the trajectory information regarding the above-described first work.

[Item 2-4]

The control device according to any one of Items 2-1 to 2-3, wherein the above-described trajectory information generating unit includes:

a first candidate information acquiring unit for acquiring first candidate information indicating each of one or more postures that picking hand takes on the above-described first position;

a second candidate information acquiring unit for acquiring second candidate information indicating each of one or more postures that the above-described picking hand takes on the above-described second position;

an extracting unit for extracting one combination from among one or more combinations regarding one or more postures indicated by the above-described first candidate information and one or more postures indicated by the above-described second candidate information;

a trajectory calculating unit for calculating a trajectory on which (i) the above-described picking hand picks, at the above-described first position, the above-described work with a posture associated with the above-described first position included in the above-described one combination and (ii) the above-described picking hand arranges, at the above-described second position, the above-described work with a posture associated with the above-described second position included in the above-described one combination; and a determining unit for determining whether an interference is present or absent on the trajectory calculated by the above-described trajectory calculating unit.

[Item 2-5]

The control device according to Item 2-4, wherein when the above-described determining unit determines that the interference occurs on the above-described trajectory, the above-described extracting unit extracts another combination from among the above-described one or more combinations, the above-described trajectory calculating unit calculates a trajectory on which (i) the above-described picking hand picks, at the above-described first position, the above-described work with a posture associated with the above-described first position included in the above-described other combination and (ii) above-described picking hand arranges, at the above-described second position, the above-described work with a posture associated with the above-described second position included in the above-described other combination, and the above-described determining unit determines whether the interference is present or absent on the trajectory being calculated by the above-described trajectory calculating unit and being associated with the above-described other combination.

[Item 2-6]

The control device according to Item 2-4, wherein when an amount or duration time of calculation in at least one of the above-described extracting unit, the above-described trajectory calculating unit and the above-described determining unit satisfies a predetermined condition, the above-described extracting unit extracts another combination from among the above-described one or more combinations, the above-described trajectory calculating unit calculates a trajectory on which (i) the above-described picking hand picks, at the above-described first position, the above-described work with a posture associated with the above-described first position included in the above-described other combination and (ii) the above-described picking hand arranges, at the above-described second position, the above-described work with a posture associated with the above-described second position included in the above-described other combination, and the above-described determining unit determines whether the interference is present or absent on the trajectory being calculated by the above-described trajectory calculating unit and being associated with the above-described other combination.

[Item 2-7]

The control device according to any one of Items 2-4 to 2-6, further including a constraint condition setting unit for determining a constraint condition regarding an amount or duration time of calculation of processing in at least one of the above-described extracting unit, the above-described trajectory calculating unit and the above-described determining unit based on an estimation result of the above-described execution time estimating unit, wherein the above-described at least one of the above-described extracting unit, the above-described trajectory calculating unit and the above-described determining unit adjusts an amount or duration time of calculation based on the constraint condition set by the above-described constraint condition setting unit.

[Item 2-8]

The control device according to Item 2-7, wherein the above-described constraint condition is at least one of (i) the maximum value of the amount or duration time of calculation that is until a progress of the processing reaches a preset milestone and (ii) the maximum value of the amount or duration time of calculation that is until the processing is completed.

[Item 2-9]

The control device according to any one of Items 2-4 to 2-8, wherein the above-described extracting unit calculates an evaluation function for at least some of the above-described one or more combinations, and selects the above-described one combination based on the above-described evaluation function.

[Item 2-10]

The control device according to any one of Items 2-4 to 2-9, wherein the above-described determining unit divides the trajectory calculated by the above-described trajectory calculating unit into a plurality of zones, and determines whether an interference is present or absent for each zone.

[Item 2-11]

The control device according to any one of Items 2-4 to 2-10, wherein the above-described trajectory information generating unit further has a trajectory determining unit for determining a trajectory of the above-described picking hand based on the determination result of the above-described determining unit.

[Item 2-12]

A picking system including the control device according to any one of Items 2-1 to 2-11; and the above-described picking apparatus.

[Item 2-13]

A distribution system including the control device according to any one of Items 2-1 to 2-10;

the above-described picking apparatus; and a conveying apparatus to convey the above-described work.

[Item 2-14]

A program to cause a computer to serve as the control device according to any one of Items 2-1 to 2-11.

[Item 2-15]

A control method for controlling a picking apparatus that arranges, at a second position of a second container, a work picked at a first position of a first container by using a picking hand, the second container being different from the above-described first container, the control method including:

a trajectory information generating step of generating trajectory information prescribing a trajectory on which the above-described picking hand picks the work at the above-described first position and arranges the work at the above-described second position;

an execution control step of operating the above-described picking apparatus based on the trajectory information generated in the above-described trajectory information generating step; and an execution time estimating step of estimating a period of time that is from the time when the above-described picking apparatus receives an instruction for starting an operation on the above-described work in the above-described execution control step to the time when the operation of the above-described picking apparatus on the above-described work is ended, wherein the above-described trajectory information generating step includes a step of adjusting the amount of calculation based on an estimation result in the above-described execution time estimating step.

[Item 2-16]

A production method of producing a second container in which a work is arranged by using a picking apparatus that arranges, at a second position of a second container, the above-described work picked at a first position of a first container by using a picking hand, the above-described second container being different from the above-described first container, the production method including:

a trajectory information generating step of generating trajectory information prescribing a trajectory on which the above-described picking hand picks the work at the above-described first position and arranges the work at the above-described second position;

an execution control step of operating the above-described picking apparatus based on trajectory information generated in the above-described trajectory information generating step;

an execution time estimating step of estimating a period of time that is from the time when the above-described picking apparatus receives an instruction for starting an operation on the above-described work in the above-described execution control step to the time when the operation of the above-described picking apparatus on the above-described work is ended, wherein the above-described trajectory information generating step includes a step of adjusting an amount of calculation based on an estimation result in the above-described execution time estimating step.

[Item 3-1]

A control device for controlling a picking apparatus that arranges, at a second position of a second container, a work picked at a first position of a first container by using a picking hand, the second container being different from the above-described first container, the control device including:

a point cloud information acquiring unit for acquiring point cloud information of a region including at least one of the above-described picking hand and the above-described work at a time being at least one of (i) when the above-described picking hand picks the above-described work at the above-described first position, (ii) when the above-described picking hand moves the above-described work out of the above-described first container, (iii) when the above-described picking hand moves the above-described work in the above-described second container and (iv) when the above-described picking hand arranges the above-described work at the above-described second position; and an abnormality detection unit for detecting an abnormality based on the point cloud information acquired by the above-described point cloud information acquiring unit.

[Item 3-2]

The control device according to Item 3-1, further including an image acquiring unit for acquiring image data of an image including at least one of the above-described picking hand and the above-described work in a field angle at the above-described at least one time, wherein the above-described point cloud information acquiring unit acquires the above-described point cloud information based on the image acquired by the above-described image acquiring unit.

[Item 3-3]

The control device according to Item 3-1 or 3-2, wherein the above-described point cloud information is three-dimensional point cloud information.

[Item 3-4]

The control device according to any one of Items 3-1 to 3-3, wherein the above-described abnormality detection unit is for detecting an abnormality based on (i) the above-described point cloud information and (ii) at least one selected from a group including: a measurement value of a sensor arranged on the above-described picking apparatus; a control value for at least one of the above-described picking hand, and a robot arm coupled with the above-described picking hand; and at least one of torque, a voltage value and a current value for a driving unit that drives at least one of the above-described picking hand and the above-described robot arm.

[Item 3-5]

The control device according to any one of Items 3-1 to 3-4, further including an instruction sending unit for sending, to the above-described picking apparatus, an instruction for suspending an operation of the above-described picking apparatus when the above-described abnormality detection unit detects the abnormality.

[Item 3-6]

A picking system including
a control device according to any one of Items 3-1 to 3-5; and
the above-described picking apparatus.

[Item 3-7]

A distribution system including
the control device according to any one of Items 3-1 to 3-5;
the above-described picking apparatus; and
a conveying apparatus to convey the above-described work.

[Item 3-8]

A program for causing a computer to serve as the control device according to any one of Items 3-1 to 3-5.

[Item 3-9]

A control method for controlling a picking apparatus that arranges, at a second position of a second container, a work picked at a first position of a first container by using a picking hand, the second container being different from the above-described first container, the control method including:

a point cloud information acquiring procedure of acquiring point cloud information of a region including at least one of the above-described picking hand and the above-described work at a time being at least one of (i) when the above-described picking hand picks the above-described work at the above-described first position, (ii) when the above-described picking hand moves the above-described work out of the above-described first container, (iii) when the above-described picking hand moves the above-described work in the above-described second container and (iv) when the above-described picking hand arranges the above-described work at the above-described second position; and an abnormality detection procedure of detecting an abnormality based on the point cloud information acquired in the above-described point cloud information acquiring procedure.

[Item 4-1]

A control device for controlling a picking apparatus that moves one or more works from one or more supply containers to one or more arrangement containers by using a picking hand, the control device including a trajectory information generating unit for generating trajectory information prescribing a trajectory on which the above-described picking hand picks one of the above-described one or more works stored in one supply container included in the above-described one or more supply containers and arranges the work on one arrangement container included in the above-described one or more arrangement containers, wherein after the process of generating trajectory information regarding a first work included in the above-described one or more work is performed and before the movement of the above-described first work is completed, the above-described trajectory information generating unit generates trajectory information regarding a second work being different from the above-described first work and included in the above-described one or more work by using an operation result in the process for generating the trajectory information regarding the above-described first work.

[Item 4-2]

The control device according to Item 4-1, further including a container information acquiring unit for acquiring information regarding at least one of a state of a surface of the above-described one supply container and a state of a surface of the above-described one arrangement container, wherein the above-described trajectory information generating unit (a) acquires or generates information regarding a position and a posture of the above-described first work in the above-described one supply container before the above-described picking apparatus moves the above-described first work in processing for generating the trajectory information regarding the above-described first work, and (b) generates trajectory information regarding the above-described second work by using (i) the information acquired by the above-described container information acquiring unit before the movement of the above-described first work is completed and (ii) the information regarding the position and the posture of the above-described first work in the above-described one supply container in the process of generating the trajectory information regarding the above-described second work.

[Item 4-3]

The control device according to Item 4-1, further including a container information acquiring unit for acquiring information regarding a state of a surface of at least one of the above-described one supply container and the above-described one arrangement container, wherein the above-described trajectory information generating unit (a) acquires or generates information regarding a position and a posture of the above-described first work in the above-described one arrangement container after the above-described picking apparatus moves the above-described first work in the process of generating the trajectory information regarding the above-described first work, and (b) generates trajectory information regarding the above-described second work by using (i) information acquired by the above-described container information acquiring unit before the movement of the above-described first work is completed and (ii) information regarding a position and a posture of the above-described first work on the above-described one arrangement container in the process of generating the trajectory information regarding the above-described second work.

[Item 4-4]

The control device according to any one of Items 4-1 to 4-3, further including an order information acquiring unit for acquiring (i) first order information that instructs to move the above-described one or more works from at least one of the above-described one or more supply containers to a first arrangement container included in the above-described one or more arrangement containers and (ii) second order information that instruct to move the above-described one or more works from at least one of the above-described one or more supply containers to a second arrangement container being included in the above-described one or more arrangement containers and being different from the above-described first arrangement container, wherein the above-described trajectory information generating unit performs a process of generating trajectory information regarding the above-described first work in accordance with the acquisition of one of the above-described first order information and the above-described second order information by the above-described order information acquiring unit, and performs the process of generating trajectory information regarding the above-described second work in accordance with the acquisition of the other of the above-described first order information and the above-described second order information by the above-described order information acquiring unit.

[Item 4-5]

The control device according to Item 4-4, wherein the above-described first order information instructs to move the above-described first work from a first supply container included in the above-described one or more supply containers to the above-described first arrangement container, the above-described second order information instructs to move the above-described second work from the above-described first supply container to the above-described second arrangement container, and the above-described trajectory information generating unit performs the process of generating trajectory information regarding the above-described first work in accordance with the acquisition of the above-described first order information by the above-described order information acquiring unit, and performs the process of generating the trajectory information regarding the above-described second work in accordance with the acquisition of the above-described second order information by the above-described order information acquiring unit.

[Item 4-6]

The control device according to any one of Items 4-1 to 4-3, further including an order information acquiring unit for acquiring (i) first order information that instructs to move the above-described one or more works from a first supply container included in the above-described one or more supply containers to at least one of the above-described one or more arrangement containers and (ii) second order information that instructs to move the above-described one or more works from a second supply container being included in the above-described one or more supply containers and being different from the above-described first supply container to at least one of the above-described one or more arrangement containers, wherein the above-described trajectory information generating unit performs the process of generating trajectory information regarding the above-described first work in accordance with the acquisition of one of the above-described first order information and the above-described second order information by the above-described order information acquiring unit, and performs the process of generating trajectory information regarding the above-described second work in accordance with the acquisition of the other of the above-described first order information and the above-described second order information by the above-described order information acquiring unit.

[Item 4-7]

The control device according to Item 4-6, wherein the above-described first order information instructs to move the above-described first work from the above-described first supply container to a first arrangement container included in the above-described one or more supply containers, the above-described second order information instructs to move the above-described second work from the above-described second supply container to the above-described first arrangement container, and the above-described trajectory information generating unit performs the process of generating the trajectory information regarding the above-described first work in accordance with the acquisition of the above-described first order information by the above-described order information acquiring unit, and performs the process of generating trajectory information regarding the above-described second work in accordance with the acquisition of the above-described second order information by the above-described order information acquiring unit.

[Item 4-8]

The control device according to any one of Items 4-1 to 4-3, further including an order information acquiring unit for acquiring (i) first order information that instructs to move the above-described first work from first supply container included in the above-described one or more supply containers to a first arrangement container included in the above-described one or more arrangement containers and (ii) second order information that instructs to move the above-described second work from a second supply container being included in the above-described one or more supply containers and being different from the above-described first supply container to a second arrangement container being included in the above-described one or more arrangement containers and being different from the above-described first arrangement container, and the above-described trajectory information generating unit performs the process of generating trajectory information regarding the above-described first work in accordance with the acquisition of the above-described first order information by the above-described order information acquiring unit, and performs the process of generating the trajectory information regarding the above-described second work in accordance with the acquisition of the above-described second order information by the above-described order information acquiring unit.

[Item 4-9]

A picking system including the control device according to any one of Items 4-1 to 4-8; and the above-described picking apparatus.

[Item 4-10]

A distribution system including the control device according to any one of Items 4-1 to 4-8;

the above-described picking apparatus; and a conveying apparatus to convey the above-described one or more works.

[Item 4-11]

A program for causing a computer to serve as the control device according to any one of Items 4-1 to 4-8.

[Item 4-12]

A control method for controlling a picking apparatus that moves one or more works from one or more supply containers to one or more arrangement containers by using a picking hand, the control method including a trajectory information generating step of generating trajectory information prescribing a trajectory on which the above-described picking hand picks one of the above-described one or more works stored in one supply container included in the above-described one or more supply containers and arranges the work on one arrangement container included in the above-described one or more arrangement containers, wherein the above-described trajectory information generating step includes a step of generating trajectory information regarding a second work being included in the above-described one or more works and being different from the above-described first work by using ab operation result in the process of generating the trajectory information regarding the above-described first work after performing the process of generating the trajectory information regarding a first work included in the above-described one or more works and before the movement of the above-described first work is completed.

[Item 4-13]

A production method of producing one or more arrangement containers in which one or more works are arranged by using a picking apparatus that moves, by using a picking hand, the above-described one or more works from one or more supply containers to the above-described one or more arrangement containers, the production method including a trajectory information generating step of generating trajectory information prescribing a trajectory on which the above-described picking hand picks one of the above-described one or more works stored in one supply container included in the above-described one or more supply containers and arranges the work on one arrangement container included in the above-described one or more arrangement containers, wherein the above-described trajectory information generating step includes a step of generating trajectory information regarding a second work being included in the above-described one or more works and being different from the above-described first work by using an operation result in the process of generating the trajectory information regarding the above-described first work after performing the process of generating the trajectory information regarding a first work included in the above-described one or more works and before the movement of the above-described first work is completed.

[Item 5-1]

An information processing apparatus including:

a three-dimensional information acquiring unit for acquiring three-dimensional information of a target object;

a holding information acquiring unit for acquiring holding information that defines a method of holding the above-described target object by using a picking hand; and an information management unit for storing, in a storage apparatus, (i) three-dimensional information of the above-described target object acquired by the above-described three-dimensional information acquiring unit and (ii) the holding information acquired by the above-described holding information acquiring unit in association with each other.

[Item 5-2]

The information processing apparatus according to Item 5-1, wherein the three-dimensional information of the above-described target object includes at least one of home position information and coordinate axis information.

[Item 5-3]

The information processing apparatus according to Item 5-1 or 5-2, further including a two-dimensional information acquiring unit for acquiring two-dimensional information of the above-described target object, wherein the above-described information management unit stores, in the above-described storage apparatus, (i) three-dimensional information of the above-described target object acquired by the above-described three-dimensional information acquiring unit, (ii) holding information acquired by the above-described holding information acquiring unit and (iii) two-dimensional information of the above-described target object acquired by the above-described two-dimensional information acquiring unit in association with each other.

[Item 5-4]

The information processing apparatus according to Item 5-3, further including a feature information acquiring unit for acquiring feature information for recognizing the above-described target object based on the two-dimensional information of the above-described target object acquired by the above-described two-dimensional information acquiring unit, wherein the above-described information management unit stores, in the above-described storage apparatus, (i) three-dimensional information of the above-described target object acquired by the above-described three-dimensional information acquiring unit, (ii) holding information acquired by the above-described holding information acquiring unit, (iii) two-dimensional information of the above-described target object acquired by the above-described two-dimensional information acquiring unit and (iv) feature information of the above-described target object acquired by the above-described feature information acquiring unit in association with each other.

[Item 5-5]

The information processing apparatus according to Item 5-1 or 5-2, further including:

a two-dimensional information acquiring unit for acquiring two-dimensional information of the above-described target object; and a feature information acquiring unit for acquiring feature information for recognizing the above-described target object based on two-dimensional information of the above-described target object acquired by the above-described two-dimensional information acquiring unit, wherein the above-described information management unit stores, in the above-described storage apparatus, (i) three-dimensional information of the above-described target object acquired by the above-described three-dimensional information acquiring unit, (ii) holding information acquired by the above-described holding information acquiring unit and (iii) feature information of the above-described target object acquired by the above-described feature information acquiring unit in association with each other.

[Item 5-6]

The information processing apparatus according to any one of Items 5-3 to 5-5, wherein the above-described two-dimensional information is image data of three or more images of the above-described target object captured from three or more directions.

[Item 5-7]

The information processing apparatus according to any one of Items 5-1 to 5-6, further including the above-described storage apparatus.

[Item 5-8]

The information processing apparatus according to any one of Items 5-1 to 5-7, wherein the above-described information management unit stores, in a storage apparatus, (i) three-dimensional information of the above-described target object acquired by the above-described three-dimensional information acquiring unit, (ii) holding information acquired by the above-described holding information acquiring unit and (iii) identification information for identifying the above-described target object in association with each other.

[Item 5-9]

The information processing apparatus according to Item 5-8, further including:

a picking control unit for controlling a picking apparatus that arranges, at a second position, a work picked at a first position by using a picking hand, the second position being different from the above-described first position;

an order information acquiring unit for acquiring order information including identification information of at least one work that is to be a working target of the picking apparatus;

a holding information storing unit for storing identification information of one or more works and holding information of the above-described one or more works in association with each other; and a holding information extracting unit for (i) accessing to the above-described storage apparatus and extract, from identification information of the above-described at least one work included in order information acquired by the above-described order information acquiring unit, the above-described holding information associated with identification information of the above-described target object matched with identification information that is not stored in the above-described holding information storing unit, and (ii) associating the identification information that is not stored in the above-described holding information storing unit with the above-described extracted holding information and store the information in the above-described holding information storing unit, wherein the above-described holding information storing unit is realized by a medium being different from the above-described storage apparatus.

[Item 5-10]

The information processing apparatus according to Item 5-9, further including:

a first candidate information generating unit for generating first candidate information indicating each of one or more postures that the above-described picking hand takes on the above-described first position with reference to the holding information stored in the above-described holding information storing unit;

a second candidate information generating unit for generating second candidate information indicating each of one or more postures that the above-described picking hand takes on the above-described second position with reference to the holding information stored in the above-described holding information storing unit;

an extracting unit for extracting one combination from among one or more combinations regarding one or more postures indicated by the above-described first candidate information and one or more postures indicated by the above-described second candidate information;

a trajectory calculating unit for calculating a trajectory on which (i) the above-described picking hand picks, at the above-described first position, the above-described work with a posture associated with the above-described first position included in the above-described one combination and (ii) the above-described picking hand arranges, at the above-described second position, the above-described work with a posture associated with the above-described second position included in the above-described one combination; and a determining unit for determining whether an interference is present or absent on the trajectory calculated by the above-described trajectory calculating unit.

[Item 5-11]

A picking system including
the information processing apparatus according to Item 5-9 or 5-10; and
the above-described picking apparatus.

[Item 5-12]

A distribution system including
the information processing apparatus according to Item 5-9 or 5-10;
the above-described picking apparatus; and
a conveying apparatus to convey the above-described work.

[Item 5-13]

A program for causing a computer to serve as the information processing apparatus according to any one of Item 5-1 to 5-10.

[Item 5-14]

An information processing method including:
a three-dimensional information acquiring step of acquiring, by a computer, three-dimensional information of a target object;
a holding information acquiring step of acquiring holding information that defines a method of holding, by a computer, the above-described target object by using a picking hand; and
an information management step of storing, in a storage apparatus by a computer, (i) three-dimensional information of the above-described target object acquired by the above-described three-dimensional information acquiring unit and (ii) holding information acquired by the above-described holding information acquiring unit in association with each other.

REFERENCE SIGNS LIST

10 . . . work; 12 . . . supply pallet; 14 . . . delivery pallet; 100 . . . distribution management system; 110 . . . article management apparatus; 120 . . . data registration apparatus; 130 . . . transfer apparatus; 140 . . . robot; 152 . . . image capturing apparatus; 154 . . . image capturing apparatus; 160 . . . transfer control apparatus; 170 . . . conveying apparatus; 172 . . . conveyor; 174 . . . conveyor; 210 . . . order information acquiring unit; 220 . . . conveying apparatus management unit; 230 . . . transfer apparatus management unit; 240 . . . request processing unit; 250 . . . article information storing unit; 312 . . . three-dimensional information acquiring unit; 314 . . . two-dimensional information acquiring unit; 316 . . . mass information acquiring unit; 320 . . . article information registration unit; 330 . . . input/output unit; 340 . . . registration information generating unit; 342 . . . coordinate information adding unit; 344 . . . holding information adding unit; 346 . . . specification information adding unit; 350 . . . registration request sending unit; 410 . . . manipulator; 412 . . . picking hand; 414 . . . robot arm; 420 . . . driving unit; 430 . . . drive control unit; 510 . . . recognition information storing unit; 520 . . . recognition unit; 530 . . . planning unit; 540 . . . execution unit; 550 . . . concurrent processing control unit; 610 . . . position and posture information generating unit; 620 . . . point cloud information generating unit; 710 . . . holding planning unit; 720 . . . arrangement planning unit; 730 . . . evaluation information storing unit; 740 . . . trajectory candidate extracting unit; 750 . . . trajectory planning unit; 760 control information generating unit; 810 . . . control information sending unit; 820 . . . execution monitoring unit; 1400 . . . data table; 1410 . . . work ID; 1420 . . . order ID; 1430 . . . contents; 1432 . . . article ID; 1434 . . . supply pallet ID; 1436 . . . delivery pallet ID.

What is claimed is:

1. A control device for controlling a picking apparatus that arranges a work picked at a first position of a first container by using a picking hand at a second position of a second container being different from the first container, the control device comprising:
a point cloud information acquiring unit for acquiring point cloud information of a region including at least one of the picking hand and the work at a time which is at least one of (i) when the picking hand moves the work in the second container and (ii) when the picking hand arranges the work at the second position;
an abnormality detection unit for detecting an abnormality based on the point cloud information acquired by the point cloud information acquiring unit; and
an instruction sending unit for sending, to the picking apparatus, an instruction for suspending an operation of the picking apparatus in response to the abnormality detection unit detecting the abnormality, wherein:
the abnormality detection unit is for detecting a load collapse inside the second container based on the point cloud information acquired by the point cloud information unit, and
the instruction sending unit is for sending, to the picking apparatus, the instruction for suspending the operation of the picking apparatus in response to the abnormality detection unit detecting the load collapse.

2. The control device according to claim 1, further comprising an image acquiring unit for acquiring image data of an image including at least one of the picking hand and the work in a field angle at the at least one time, wherein:
the point cloud information acquiring unit acquires the point cloud information based on the image acquired by the image acquiring unit.

3. The control device according to claim 1, wherein the point cloud information is three-dimensional point cloud information.

4. The control device according to claim 1, wherein:
the abnormality detection unit is for detecting the abnormality based on (i) the point cloud information and (ii) at least one selected from a group including: a measurement value for a sensor arranged on the picking apparatus; a control value for at least one of the picking hand, and a robot arm coupled with the picking hand; and at least one of torque, a voltage value and a current value for a driving unit that drives at least one of the picking hand and the robot arm.

5. The control device according to claim 1, wherein:
the abnormality detection unit is for detecting an interference based on the point cloud information acquired by the point cloud information unit, and
the instruction sending unit is for sending, to the picking apparatus, an instruction for suspending an operation of the picking apparatus in response to the abnormality detection unit detecting the interference.

6. A tangible, non-transitory computer-readable medium having processor instructions stored thereon that, when executed cause the processor to perform operations for controlling a picking apparatus that arranges a work picked at a first position of a first container by using a picking hand at a second position of a second container being different from the first container, the operations comprising:
acquiring point cloud information representing a region including at least one of the picking hand and the work at a time that is at least one of (i) when the picking hand moves the work in the second container, and (ii) when the picking hand arranges the work at the second position;

detecting an abnormality based on the point cloud information acquired in the acquiring point cloud information and sending, to the picking apparatus, an instruction for suspending an operation of the picking apparatus in response to the detecting abnormality detecting the abnormality, wherein:

the detecting the abnormality includes detecting a load collapse inside the second container based on the point cloud information acquired in the acquiring point cloud information, the sending the instruction includes sending, to the picking apparatus, the instruction for suspending the operation of the picking apparatus in response to detecting the load collapse.

7. A control method for controlling a picking apparatus that arranges a work picked at a first position of a first container by using a picking hand at a second position of a second container being different from the first container, the control method comprising:

acquiring point cloud information of a region including at least one of the picking hand and the work at a time that is at least one of (i) when the picking hand moves the work in the second container, and (ii) when the picking hand arranges the work at the second position; and detecting an abnormality based on the point cloud information acquired in the acquiring point cloud information and sending, to the picking apparatus, an instruction for suspending an operation of the picking apparatus in response to the detecting abnormality detecting the abnormality, wherein:

the detecting the abnormality includes detecting a load collapse inside the second container based on the point cloud information acquired in the acquiring point cloud information, the sending the instruction includes sending, to the picking apparatus, the instruction for suspending the operation of the picking apparatus in response to detecting the load collapse.

* * * * *